United States Patent
Smith et al.

(10) Patent No.: US 7,966,150 B2
(45) Date of Patent: Jun. 21, 2011

(54) DATA ANALYSIS APPLICATIONS

(75) Inventors: Donville Smith, Royal Palm Beach, FL (US); Marcos Suero, Norcross, GA (US); Eduardo J. More, Palm Beach Gardens, FL (US); Gary Moncrief, Jr., Port St. Lucie, FL (US); Jennifer D Chaney, Tequesta, FL (US)

(73) Assignee: Florida Power & Light Company, Juno Beach, FL (US)

( * ) Notice: Subject to any disclaimer, the term of this patent is extended or adjusted under 35 U.S.C. 154(b) by 1616 days.

(21) Appl. No.: 11/281,947

(22) Filed: Nov. 17, 2005

(65) Prior Publication Data

US 2007/0109301 A1    May 17, 2007

(51) Int. Cl.
*G06T 11/20* (2006.01)

(52) U.S. Cl. ......... 702/182; 702/187; 340/3.1; 340/500; 340/517; 340/521; 700/108

(58) Field of Classification Search ............... 700/108
See application file for complete search history.

(56) References Cited

U.S. PATENT DOCUMENTS

| | | | |
|---|---|---|---|
| 3,882,305 A | 5/1975 | Johnstone | |
| 4,976,144 A | 12/1990 | Fitzgerald | |
| 5,115,406 A | 5/1992 | Zatezalo et al. | |
| 5,197,328 A | 3/1993 | Fitzgerald | |
| 5,210,704 A | 5/1993 | Husseiny | |
| RE34,559 E | 3/1994 | Mickowski | |
| 5,485,491 A | 1/1996 | Salnick et al. | |
| 5,549,080 A | 8/1996 | Uchikawa | |
| 5,563,351 A | 10/1996 | Miller | |
| 5,566,092 A | 10/1996 | Wang et al. | |
| 5,587,931 A | 12/1996 | Jones et al. | |
| 5,602,757 A | 2/1997 | Haseley et al. | |
| 5,628,229 A | 5/1997 | Krone et al. | |
| 5,649,440 A | 7/1997 | Arnautu et al. | |
| 5,649,449 A | 7/1997 | Algers | |
| 6,330,525 B1 | 12/2001 | Hays et al. | |
| 7,151,976 B2 * | 12/2006 | Lin | 700/108 |
| 7,606,681 B2 * | 10/2009 | Esmaili et al. | 702/187 |

* cited by examiner

*Primary Examiner* — Drew A. Dunn
*Assistant Examiner* — Hien X Vo
(74) *Attorney, Agent, or Firm* — Feldman Gale, P.A.

(57) ABSTRACT

A system and method of monitoring equipment performance and predicting failures. The system can include a data historian that stores data for a piece of equipment and designates the data to tags. The tags can correspond to sensors that gather the data from the piece of equipment. A matrix model builder application can allow a user to generate regression models for various time spans to determine whether new data is within a normal operating range.

35 Claims, 30 Drawing Sheets

585

| | | |
|---|---|---|
| PMT1 FWHtrCndsOutTemp_GenMW_FWHtrDrnTemp | 198.8458 | 197.7 |
| PPN1 XctrBrgVib_LbOilBrgTmp_GenMW | 1.281727E-02 | 3.570511E-02 |
| PMT2 FWHtrCndsOutTemp_GenMW_FWHtrDrnTemp | 177.1895 | 176.2 |
| PMR2 - Air to Gas Flow | 418.8796 | 430.2 |
| PMR1 air_flow (fuel, stm flow)_calc | -0.9917383 | 0 |
| PMR2 air_flow (fuel, steam flow)_calc | 23.04251 | 22.06167 |
| PMT1 air_flow (fuel, steam)_calc | 32.09562 | 31.92177 |
| PMT2 air_flow (fuel,steam)_calc | 22.99422 | 22.20656 |
| PMT2 Exciter Alarm | 23.35615 | 0 |
| PPE4 CondBkPres_CondTemp_GenMW | 1.010799 | 0.6752014 |
| PFM 2A CT Chmb 1 Med Freq Press - Crk Liner | 0.4843382 | 0.1908921 |
| PFM 2A CT Chmb 10 Med Freq Press - Crk Liner | 1.701582 | 0.1924333 |
| PFM 2A CT Chmb 11 Med Freq Press - Crk Liner | 0.1710517 | 0.205389? |

DATA ANALYSIS APPLICATIONS

BACKGROUND

As manufacturing and plant systems become more automated, mechanisms that monitor the manufacturing and plant equipment and machinery become more important and prominent. Many current manufacturing and plant systems employ monitoring devices and systems to track the operation of equipment and machinery. The monitoring devices and systems can be used to determine the status of the equipment and machinery and to predict the possibility of failure.

If one or more pieces of equipment or machinery fail, the operation of the entire manufacturing system or plant can suffer. Failing equipment and machinery can cause significant damages or unwanted modifications to the output of the manufacturing system or to other pieces of equipment or machinery in the manufacturing system or plant. In some situations, the damages or modifications can be dangerous to the equipment operators.

SUMMARY

There is a need for improved methods and systems of gathering and analyzing data from manufacturing systems and plants.

One embodiment of the invention generally includes a data historian that stores historical data for a piece of equipment and designates the historical data with at least two input tags. At least one sensor can be used to gather new data from the piece of equipment corresponding to the input tags. A matrix model builder application can allow a user to select a first time span for the input tags from the historical data, and generate a regression model. The regression model can include an expected output tag for the input tags. The regression model can also be used to select a second time span for the input tags that includes new data, and compare the second time span with the new data to the expected output tag. In doing so, a determination can be made as to whether the new data is within a normal operating range.

Other features and advantages of the invention will become apparent to those skilled in the art upon review of the following detailed description, claims, and drawings.

BRIEF DESCRIPTION OF THE DRAWINGS

FIG. 8 is an illustration of a screen of a matrix equation processor application according to one embodiment of the invention.

FIG. 16F is an illustration of another screen of the excursion monitor application.

DETAILED DESCRIPTION

Figure 1:
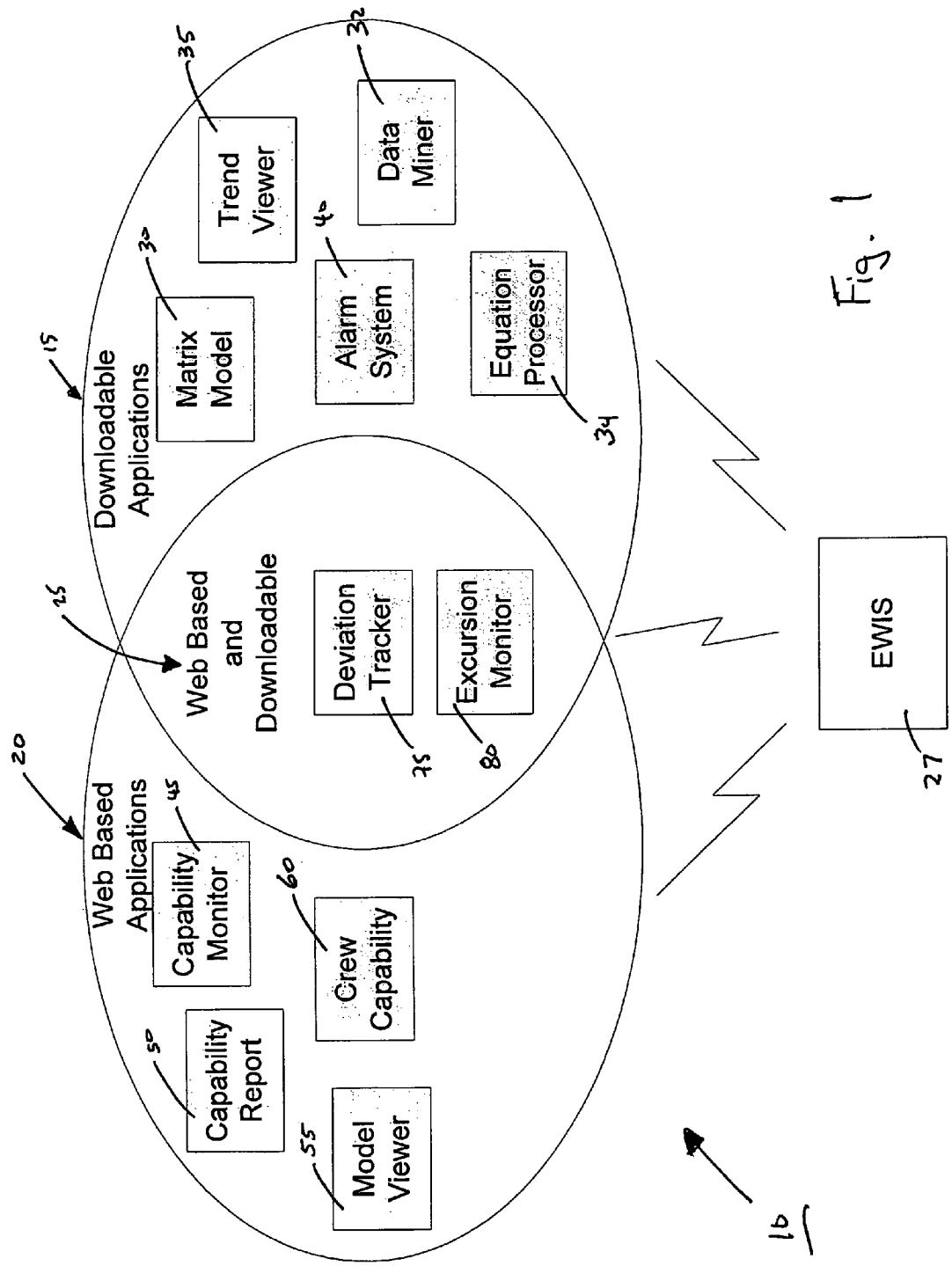
FIG. 1 is a schematic illustration of set of data analysis applications according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings, and can include electrical connections, whether direct or indirect.

In addition, it should be understood that embodiments of the invention can include hardware, software, firmware, and/or electronic components or modules (such as integrated circuits or programmable logic controllers) that, for purposes of discussion, may be illustrated and described as if the majority of the components were implemented solely in hardware. However, one of ordinary skill in the art, and based on a reading of this detailed description, would recognize that, in at least one embodiment, any electronic-based aspects of the invention may be implemented in software. As such, it should be noted that a plurality of hardware and software-based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

Embodiments of the invention relate to computer applications that can be initialized and run using personal computers ("PC") or workstations. However, it should be understood that the computer applications described herein can be adapted to operate on any computer interface (e.g., laptop, palmtop, personal organizer, cellular phone with computing device, etc.), and is not limited to PC's. Some of the applications described require a user to "select" objects on the computer interface (e.g., a link, an icon, an input field, etc.). Selections can be made with a variety of user-manipulatable computer input devices, including for example, a mouse, a keyboard, a touch screen, or a track ball pointing device.

FIG. 1 illustrates a set of data analysis applications 10 that can be used in a manufacturing or plant facility (e.g., a power plant, a paper mill, or a foundry). The data analysis applications 10 can include one or more downloadable applications 15, as well as one or more web-based applications 20. Additionally, some of the data analysis applications 10 can be implemented as either a downloadable application 15 or a web based application 20 (as represented by the intersection 25 of the two ovals in FIG. 1). In one embodiment, a real-time data archive system or an enterprise-wide information system ("EWIS") 27 can be used to collect data from various pieces of equipment and/or machinery (i.e., one or more devices) and make it available for the data analysis applications 10. For example, the EWIS 27 can be used to collect the temperature of a turbine or vibration information from a bearing with the use of "tags." Each tag can represent a system or device that is used to collect information from equipment or machinery. The type of information that is collected with the tags can be referred to as an equipment parameter (e.g., the temperature parameter of machine "A" or the vibration parameter of machine part "B"). In one embodiment, the EWIS 27 is the "PI System," developed by OSIsoft; however, other data acquisition and archiving systems can be used. The data analysis applications 10 can use the information collected to monitor the current activity of equipment or machinery, as well as to predict future problems or failures.

In order to make the data analysis applications 10 accessible for multiple users in a large manufacturing or plant environment, a web site can be created that includes links to both the web-based applications 20 and the downloadable applications 15. A link can be used to initialize an application, for example, by selecting a hyperlink or application icon with a computer input device. The web site can be located on the Internet and be available to anyone with an Internet connection, or on an intranet that is available only to computers connected to a server within the manufacturing or plant facility. The web-based application links can initialize the web-based applications 20 by opening a new user interface (e.g., a window or a screen). The downloadable application links can be used to initialize a download sequence, which can download the downloadable application 15 to a computer from which the link was initialized.

The web-based applications 20 and downloadable applications 15 can be written in various computer languages. In some embodiments, the web-based applications 20 can be written in a computer language for web-based components (e.g., Java), and can manage the data from the EWIS 27 through a data managing component (e.g., Enterprise Java Bean). Graphing and plotting components of the web-based applications 20 and the downloadable applications 15 can use third party software applications (e.g., FreeChart). In some embodiments, the downloadable applications 15 can be written in a block-structured language (e.g., Microsoft Visual Basic) or an object based language (e.g., C++).

FIG. 1 illustrates data analysis applications 10 including one or more downloadable applications 15, such as a matrix model builder application 30, a data miner application 32, an equation processor application 34, a trend viewer application 35, and an alarm system application 40. The downloadable applications 15 can be installed or downloaded to a computer so that the data from the EWIS 27 can be viewed and manipulated. The manner in which the data is displayed and the type of equipment or machinery that is monitored is dependent on each particular data analysis application 10.

The matrix model builder application 30 can be used to present a user with a graphical interface for developing and analyzing regression models. The regression models can be used to monitor equipment performance and predict failures. The regression models can be created using a polynomial regression method (e.g., linear, quadratic, or cubic). The matrix model builder application 30 can allow the user to choose one or more input parameters and one or more output parameters. The regression models can be created from the input and output parameters, and corresponding regression equations can be derived from the regression models. The input and output parameters can be derived from sensing devices or systems, and then designated with tags, which can be linked to the EWIS 27.

Figure 2:
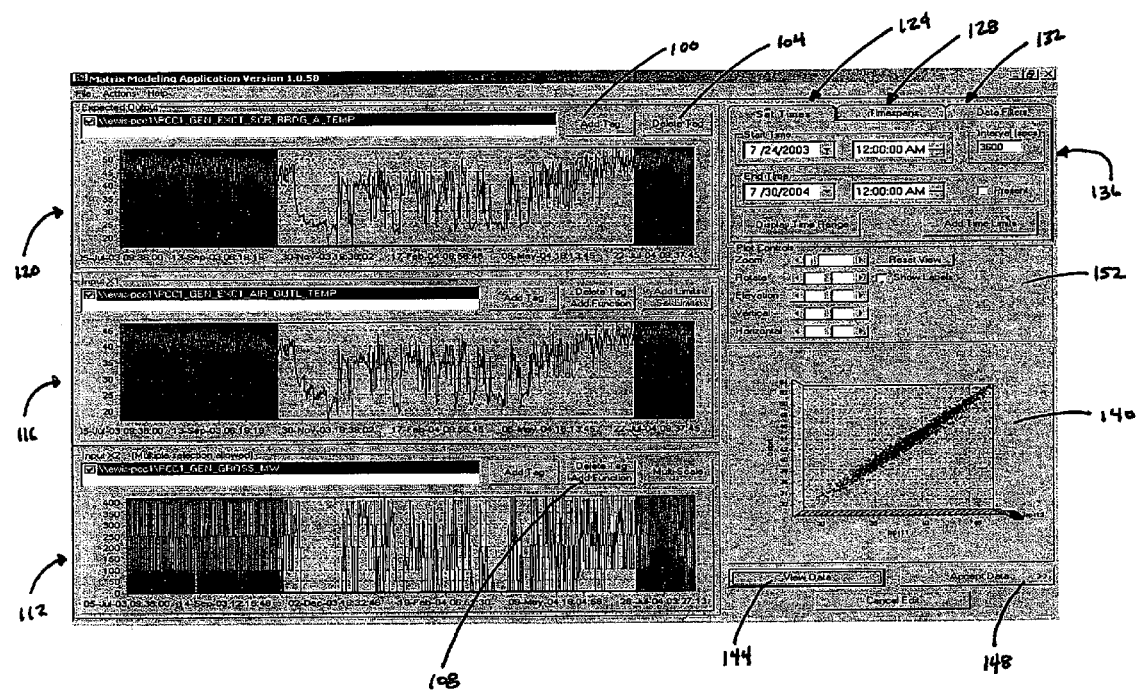
FIG. 2 is an illustration of a screen of a matrix model builder application according to one embodiment of the invention.

FIG. 2 illustrates a screen of one embodiment of the matrix model builder application 30. The user can select input and output parameters (i.e., input and output tags) that can be used to create a model to which a regression equation can be fit. The input and output tags can be selected using the Add Tag button 100 or removed using the Delete Tag button 104. The screen of FIG. 2 can include an add Function button 108. The raw data for the selected input and output tags can be displayed on input plot trends 112, 116 and on an output plot trend 120. In other embodiments, more or fewer tags and respective plot trends can be used. The user can add time limits to define the time ranges from which data will be retrieved by selecting a Set Times tab 124 and a Timespans tab 128. The user can also apply filters to the data by selecting a Data Filters tab 132. Each tab can include one or more input fields 136 in which the user can enter the desired display option (e.g., time spans, filters, intervals, ranges, limits, etc.). The data from the input and output tags can also be plotted on a scatter plot 140. The scatter plot 140 can be initiated using a View Data button 144. If the data displayed in the scatter plot 140 meets the satisfaction of the user, the user can select an Accept Data button 148 to initialize another screen that illustrates the scatter plot 140 in greater detail (as shown and described with respect to FIG. 3). If the data displayed in the scatter plot 140 does not meet the expectations of the user, the user can select a different set of input or output tags, and the data displayed in the scatter plot 140 can be refreshed with the Accept Data button 148. The manner in which the scatter plot 140 is displayed can be changed prior to acceptance using the plot control options 152, such as zoom, rotate, elevation, vertical, and horizontal.

Figure 3:
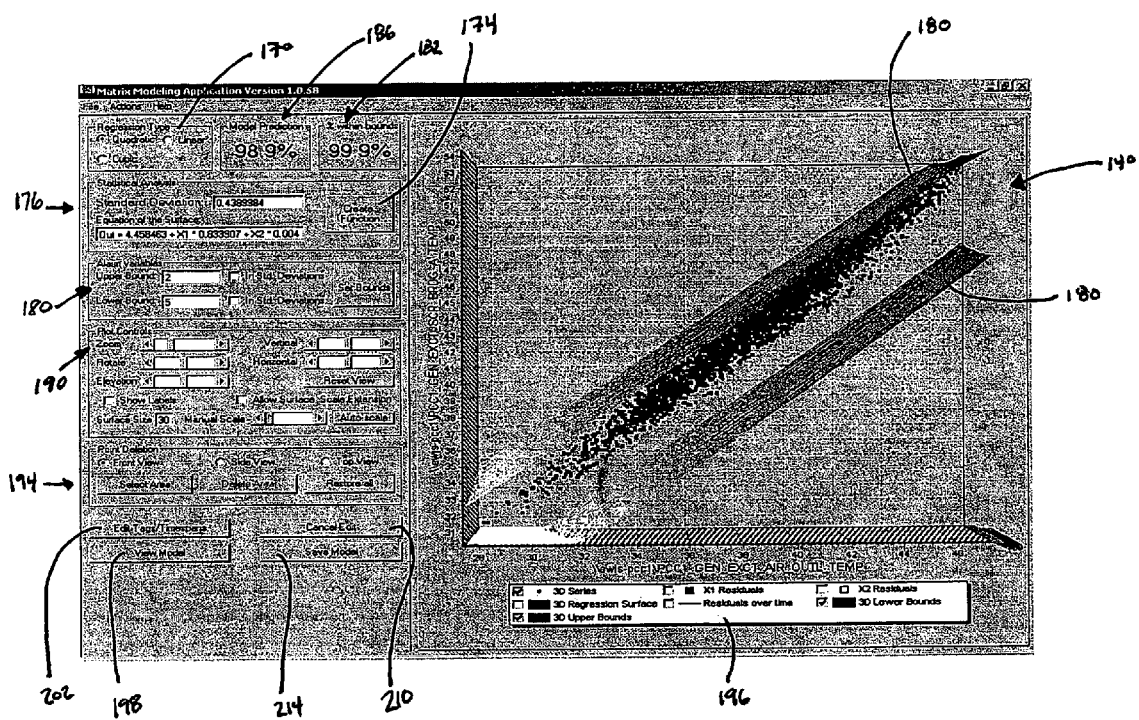
FIG. 3 is an illustration of another screen of the matrix model builder application.

The scatter plot 140 created using the screen of FIG. 2 can be seen in greater detail in the screen shown in FIG. 3. Using the screen of FIG. 3, the user can select one or more options to condition the data displayed in the scatter plot 140. For example, a polynomial regression type (e.g., linear, quadratic, or cubic) can be selected from the Regression Type selection box 170. After a regression type is selected, the matrix model builder application 30 can create a best fit curve or equation using a series of matrix and vector mathematics. The best fit curve or equation can be applied and initiated using the Create Function button 174. The standard deviation of the data and an equation of the surface of the scatter plot 140 can be displayed in the appropriate statistical analysis fields 176. Bounds for the scatter plot 140 can be chosen using the upper bound and lower bound boxes in alarm variables fields 178 and can be displayed in the scatter plot 140.

As shown on the scatter plot 140, bounds 180 can be set by the user and used to represent expected values for normal equipment data. The bounds 180 can be based on engineering units or on standard deviations. If multiple values are outside of the bounds 180, an incipient change in equipment operation can be projected. The percentage of the data points that are included within the bounds, along with a model prediction value $R^2$ can be displayed in the percentage boxes 182 and 186, respectively.

Plot controls 190 can be used to change the manner in which the scatter plot 140 is viewed (e.g., to zoom, to rotate, change vertical, change horizontal, change elevation, etc.). The scatter plot 140 can also be changed using plot option controls 196. For example, the user can choose to display the upper and lower bounds, but not residual information by selecting the corresponding boxes of the plot option controls 196.

Individual or entire sections of the scatter plot 140 can also be removed using the Point Deletion options 194. The Point Deletion options 194 can be used if a particular point or set of points is known to be invalid (e.g., sporadic equipment values due to a breakdown), and the regression equation/model is only desired for valid data. The tags and time spans that were selected using the screen of FIG. 2 can be changed using the screen of FIG. 3 by selecting an Edit Tags/Timespans button 202. If the tags or time spans are changed, a new scatter plot 140 can be created. Each time the bounds are set or points are deleted, the scatter plot 140 can be refreshed using a View Model button 206. If unintentional edits are made to the scatter plot 140 (e.g., points are deleted), the user can return to the original scatter plot 140 using a Cancel Edit button 210. The scatter plot 140 can be saved as a regression model with the edits made by the user by selecting a Save Model button 214. If the file is saved, the regression model file will contain all the parameters on which the model was created.

Figure 4:
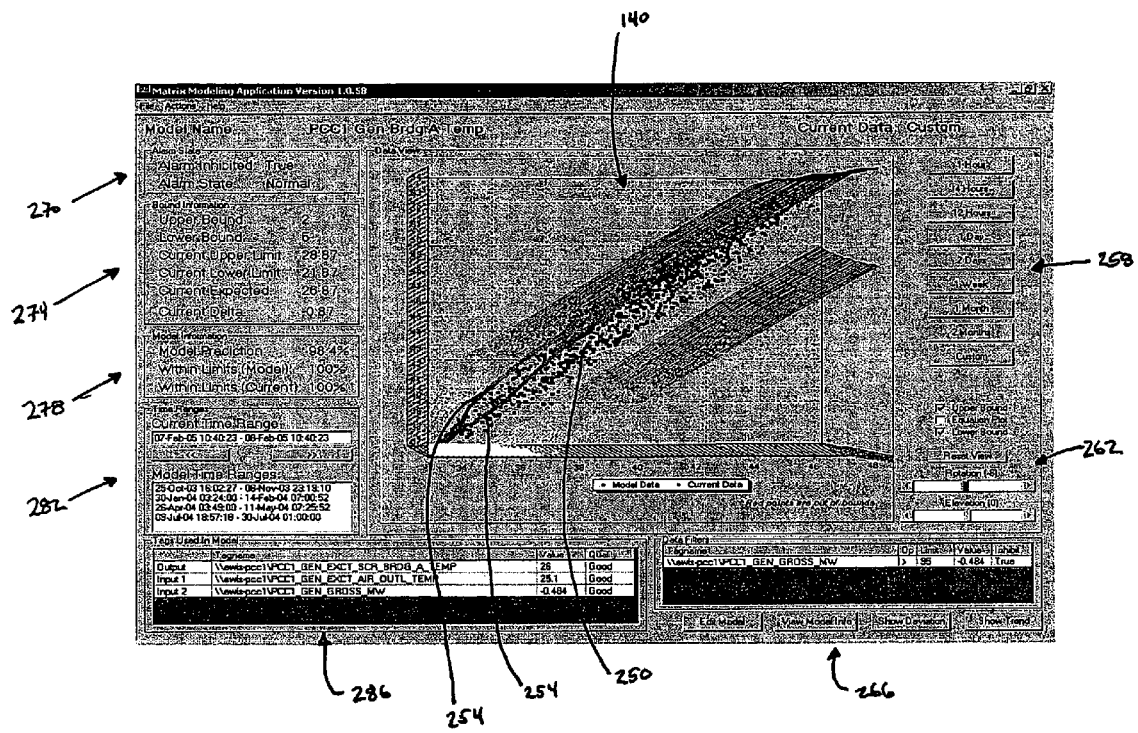
FIG. 4 is an illustration of yet another screen of the matrix model builder application.

Using the screen shown in FIG. 4, the matrix model builder application 30 can be used to compare data from a prior time period to more recent data by using the regression model files that have been saved. For example, data that is 24 hours old can be viewed simultaneously with data that is several months old by using the saved regression model parameters. Current data can be plotted along with archived data to give an indication of how equipment connected to the EWIS 27 is currently behaving relative to the saved regression model. As shown in FIG. 4, archived data can be represented by square blocks 250 and current data can be represented by lines 254. A change in the equipment's operation can cause the current data 254 to fall outside the bounds of the regression model. The archived data 250 can allow the user to have a basis for comparison.

The user can click on Timing buttons 258 to choose the time span to compare data via the regression model. One or more scatter plot controls 262 can be used to control the graphics that are included (i.e., upper bound, lower bound, equation plot) and the manner in which they are displayed (i.e., rotation and elevation). Other functions of the model can be controlled by one or more additional control buttons 266. For example, information about the regression model can be displayed (e.g., time of creation and tags used to create), the regression model can be altered, the deviation can be displayed, and trend information can be displayed using the control buttons 266. The screen of FIG. 4 can display information about the regression model, such as alarm states 270, bounds 274, models 278, and time ranges 282. The tags that were used to create the regression model can be listed in a Tags Used In Model box 286.

Figure 5:
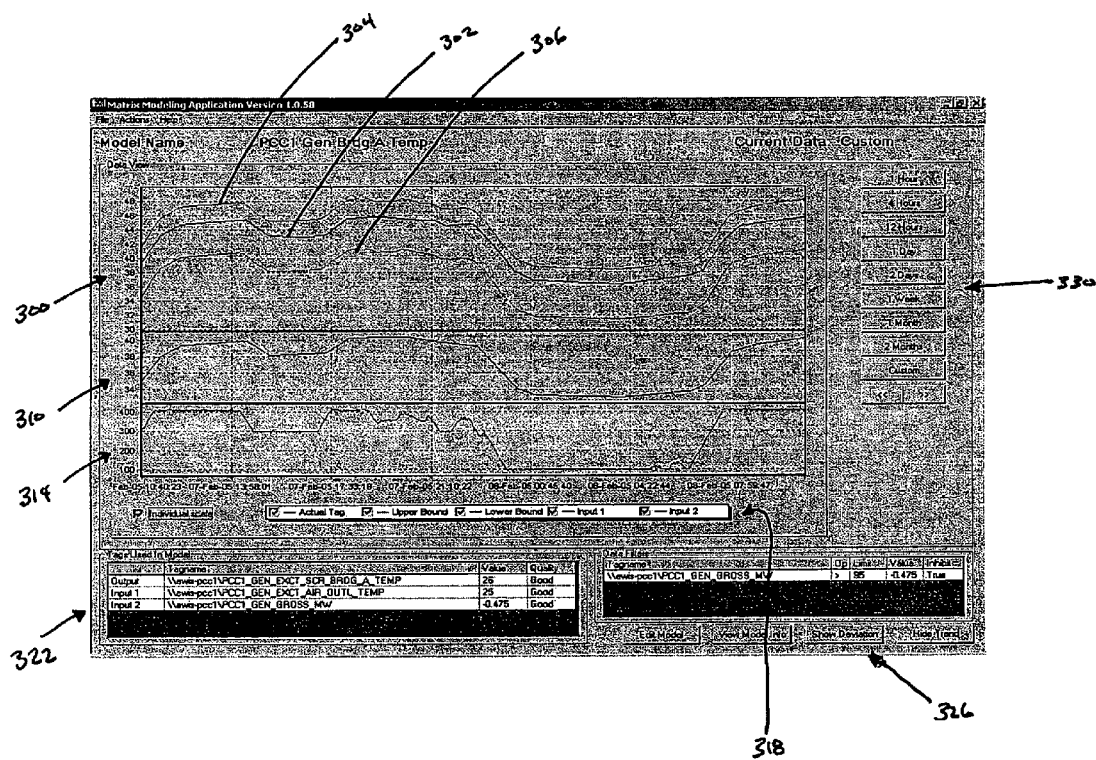
FIG. 5 is an illustration of still another screen of the matrix model builder application.

FIG. 5 illustrates a two-dimensional X-Y plot of the raw data for the input and output parameters or tags and the equation-based bounds that were specified using the screen of FIG. 4. The two-dimensional X-Y plot can be a useful way to separate the input tags from the output tags and the bounds. The screen of FIG. 5 can include an output plot 302 with an upper bound 304 and a lower bound 306 shown above and below the output plot 302, respectively. A first input plot 310 can represent a first input parameter from FIG. 4 and a second input plot 314 can represent a second input parameter from FIG. 4. A display selection bar 318 can be used to display or remove plots from the screen. The parameters or tags used in the plots can be displayed in a Tags Used In Model box 322. The parameters or tags that were used and the regression model that was created before initializing the screen of FIG. 5 can be altered using Model buttons 326 (e.g., edit model, view model, show deviation, and hide trend). Additionally, the time duration that is used in the plots of FIG. 5 can be altered using Time Duration buttons 330.

Figure 6:
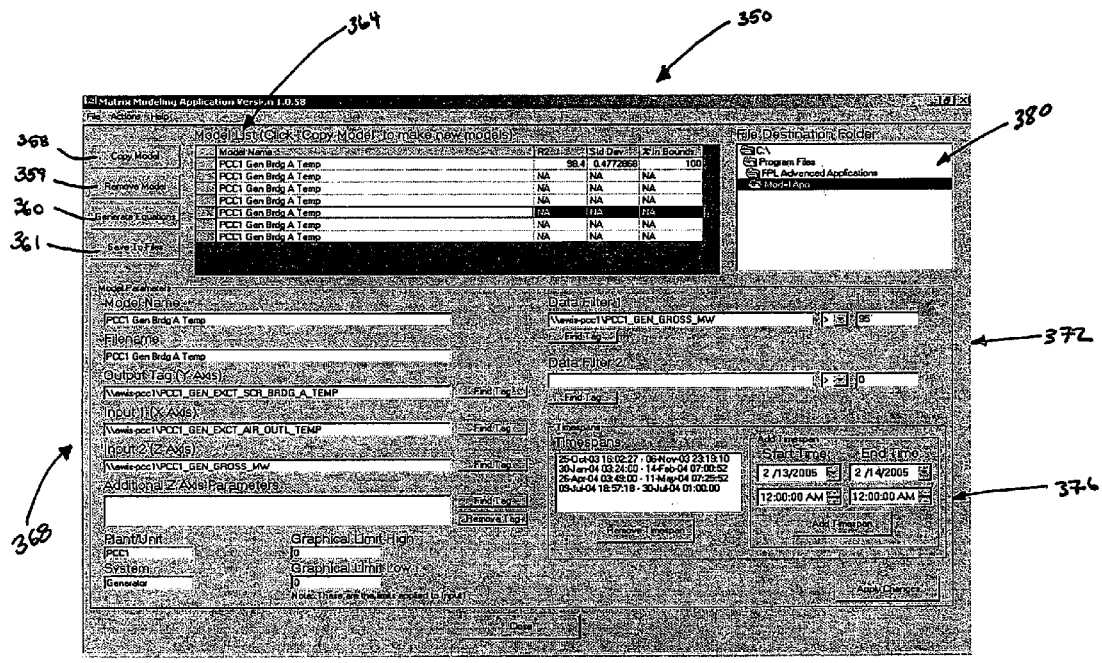
FIG. 6 is an illustration of a further screen of the matrix model builder application.

The matrix model builder application 30 can also be used to rapidly replicate saved regression models with alternative operating parameters or tags. FIG. 6 illustrates a screen for a replication interface 350. The replication interface 350 can allow the user to access a saved regression model and use it as a template for other parameters or tags. For example, a regression model can be copied with different input, output, and filter tags, as well as alternative time spans. FIG. 6 illustrates model buttons that can include a Copy Model button 358, a Remove Model 359, a Generate Equations button 360, and a Save to Files button 361. A Model List button 364 can be used as a reference for the models that have been created. The user can select each regression model individually from the Model List 364 and can make changes to certain parameters, such as the name, input/output tags, time ranges, and filters. The regression model parameters can be changed by the user with input and output fields 368 and filter fields 372. Additionally, the time spans for each regression model can be changed with time span fields 376. If the user chooses to save a regression model, a path and directory can be selected using a file destination folder window 380.

Figure 7:
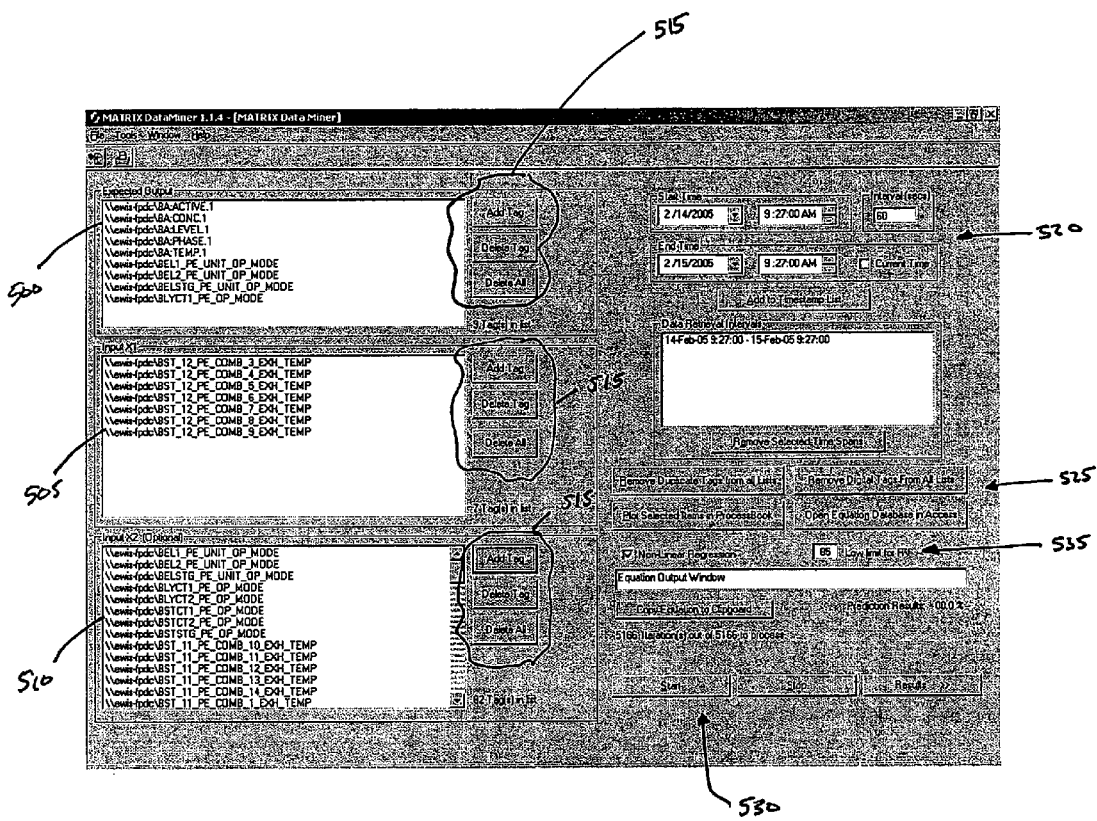
FIG. 7 is an illustration of a screen of a matrix data miner application according to one embodiment of the invention.

The matrix data miner application 32 schematically shown in FIG. 1 can be used in conjunction with the matrix model builder application 30. FIG. 7 illustrates a screen of the matrix data miner application 32. The matrix data miner application 32 can facilitate searches for correlated process parameters. For example, the user can enter one or more tags in an Expected Output field 500, an Input 1 field 505, and an optional Input 2 field 510 using field input button sets 515. The user can also set a time range from which to retrieve data using time span fields 520. Additionally, the matrix data miner application 32 can manipulate the tag lists, plot selected tags, or open tag equations using the tag conditioning buttons 525. A Start button 530 can be selected after the tags have been chosen by the user to initiate a regression analysis of the tags to find correlated parameters. The degree of correlation is determined by an $R^2$ value. A minimum $R^2$ value can be set using a Low Limit for $R^2$ field 535. Accordingly, any sets of variables with an $R^2$ value higher than the minimum can be saved to a list. The list can be sorted by $R^2$ value, which can move the most highly-correlated relationships to the top of the list.

The equation processor application 34 schematically shown in FIG. 1 can also be used in conjunction with the matrix model builder application 30. The equation processor application 34 can process and calculate (in real-time, in some embodiments) output values for regression models created in the matrix model builder application 30. FIG. 8 illustrates a screen of the matrix equation processor 34. The matrix equation processor 34 can substantially continuously retrieve input parameters, calculate the corresponding output, and write the output to a database. Matrix models that were created and saved using the matrix model builder application 30 can be loaded using a Load Models button 580 and can be listed in a parameter viewing window 585. The tags can also be automatically loaded using an Autoload selection box 590. In some embodiments, the matrix equation processor 34 can monitor the actual outputs in real-time, as well as compare the real-time outputs with expected output values. If the actual and expected output values are substantially different, the user can project that the machinery is functioning incorrectly. In one embodiment, the equation processor is also linked to an alarm system (as shown and described with respect to FIGS. 10A-10E), and can automatically initialize an alarm signal when the real-time outputs vary from the expected outputs.

Figure 9A:
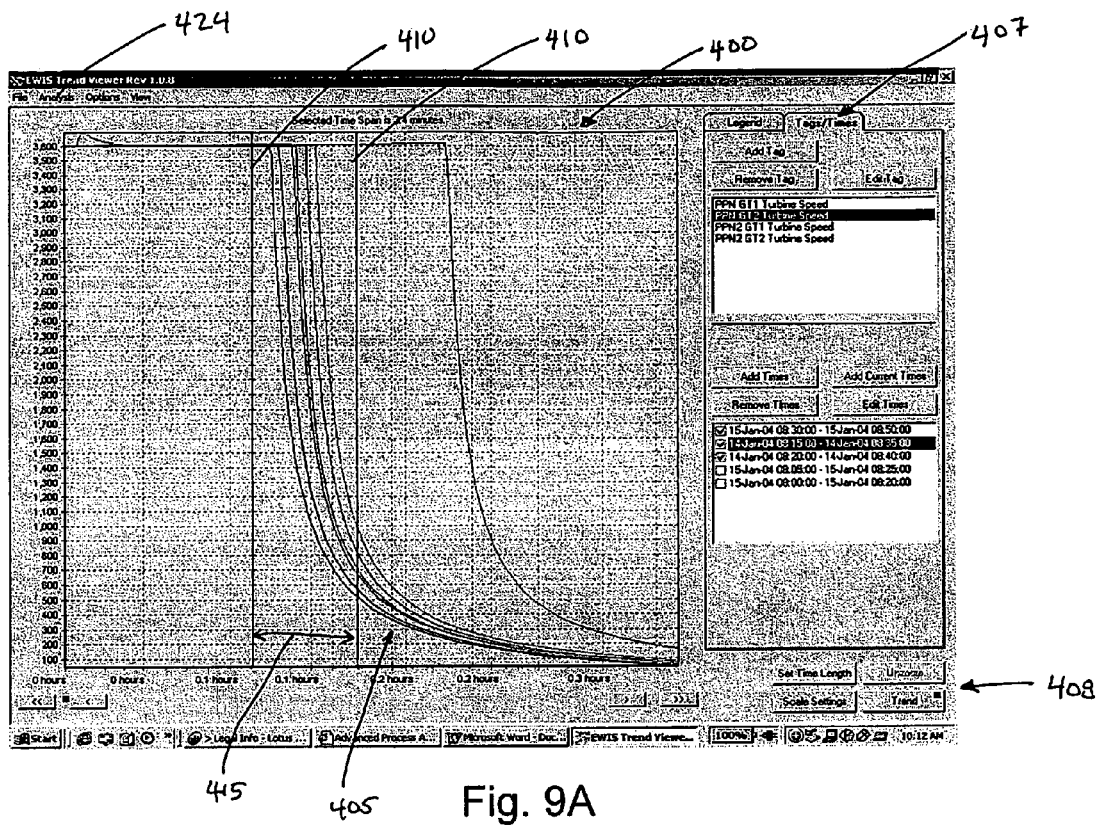
FIG. 9A is an illustration of a screen of a trend viewer application according to one embodiment of the invention.
Figure 9B:
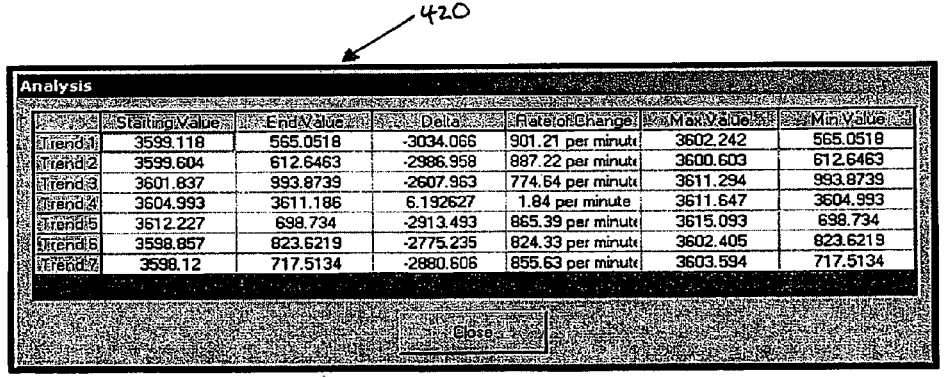
FIG. 9B is an illustration of another screen of the trend viewer application.

The trend viewer application 35 schematically shown in FIG. 1 can also be used to monitor and compare equipment parameters over different time ranges. FIG. 9A illustrates a screen of the trend viewer application 35. The trend viewer application 35 can compare similar equipment over alternative time ranges using a single plot 400 with multiple plot lines 405. The equipment parameters can be selected by the user with a Tags/Times selection box 407. By examining similar equipment on the single plot 400, a user can analyze problems or changes between repeated events or tasks over time. The parameters can be shown on the single plot 400 with a single scale or with multiple scales. The scales and time durations of the plot lines can be selected using trend buttons 408. The trend viewer application 35 can also be used to zoom in on the plot lines 405. The single plot 400 can include two vertical lines 410, which can provide an area of focus for the plot lines 405 in a selected region 415 (i.e., the region between the two vertical lines 410). Information such as a starting value, an ending value, a delta, a rate of change, a maximum value, and a minimum value can be calculated by the trend viewer application 35 and displayed for the user. FIG. 9B illustrates a screen with the information that can be calculated after a region 415 is selected with the vertical lines 410. FIG. 9B illustrates an analysis box 420 that can be initialized by the user with an analysis pull down menu 424, as shown in FIG. 9A.

Figure 10A:
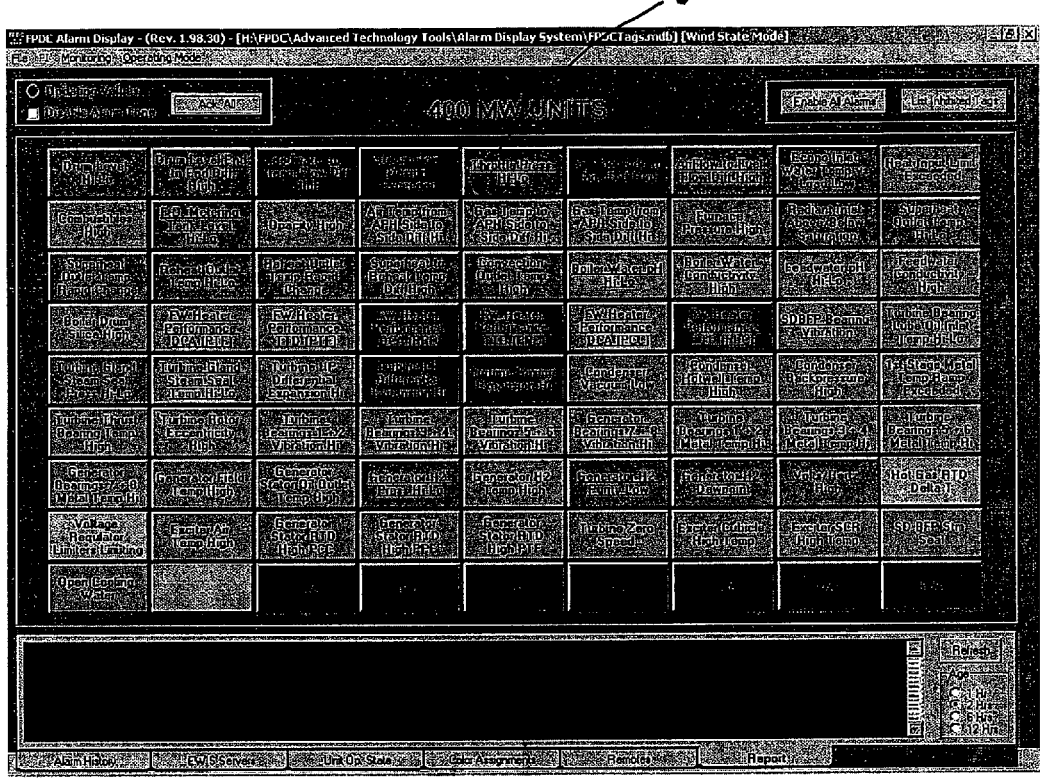
FIG. 10A is an illustration of a screen of an alarm system application according to one embodiment of the invention.

Data from pieces of equipment and machinery can be acquired using the EWIS 27. A baseline or "normal" range of values for each of the monitored parameters can be observed over time by examining the data from the EWIS 27. Data that falls outside of the normal range can indicate that the equipment or machinery is not operating correctly. An alarm system 40 can be used to alert a user of abnormal data and potential equipment failures. FIG. 10A illustrates a screen of the alarm system application 40 shown schematically in FIG. 1. The alarm system application 40 can be downloaded and run on one computer, or viewed and controlled remotely from a separate computer that accesses the downloaded application from a network. The alarm system application 40 can begin automatically by reading alarm parameters from a database at equipment startup. After the alarm system application 40 is running, it can substantially continually read data from the EWIS 27 and compare the data to alarm limits as shown in FIG. 10A, parameter blocks 620 can change colors according to the value of the data that is gathered by the EWIS 27, with different colors representing different alarm severities. Multiple sensors for multiple parameter tags can be included in a single parameter block 620 to conserve screen space.

Figure 10B:
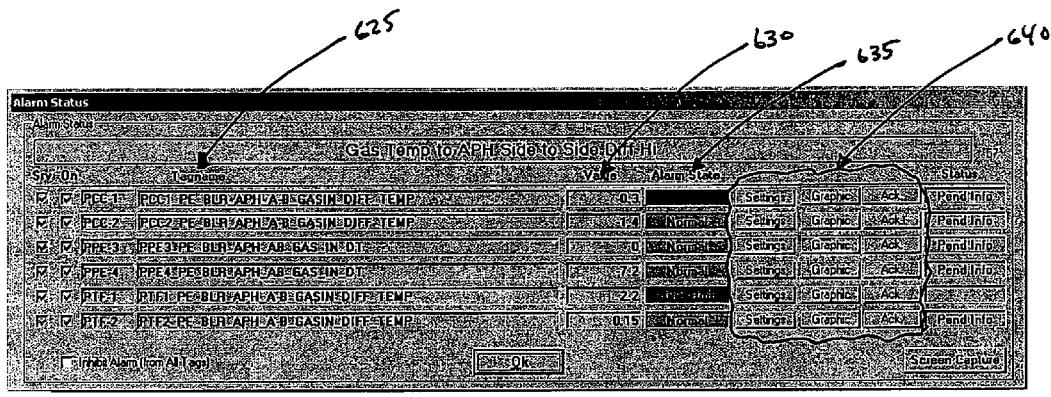
FIG. 10B is an illustration of another screen of the alarm system application.

FIG. 10B illustrates a screen that can be initialized by selecting one of the parameter blocks 620 of FIG. 10A. The screen of FIG. 10B can display a list of parameters (i.e., tag names) 625, a list of current values 630 of the parameters, and a list of the alarm states 635. The alarm states 635 can change color and/or text, depending on the value (i.e., the EWIS value) of the parameter 625. Each of the parameter blocks 620 of FIG. 10A can correspond to certain pieces of equipment or machinery, while each of the parameters 625 listed in FIG. 10B can correspond to individual sensors implemented to monitor that piece of equipment or machinery. For example, a turbine can have several sensors associated with it that can monitor its speed, temperature, energy produced, etc. Each of those individual sensors can correspond to a parameter 625, as listed in FIG. 10B, with the group of parameters 625 corresponding to a parameter block 620 designated to the turbine as shown in FIG. 10A. Each of the parameters 625 listed in FIG. 10B can include input buttons 640 that can allow the user to view details and change settings for each parameter alarm.

Figure 10C:
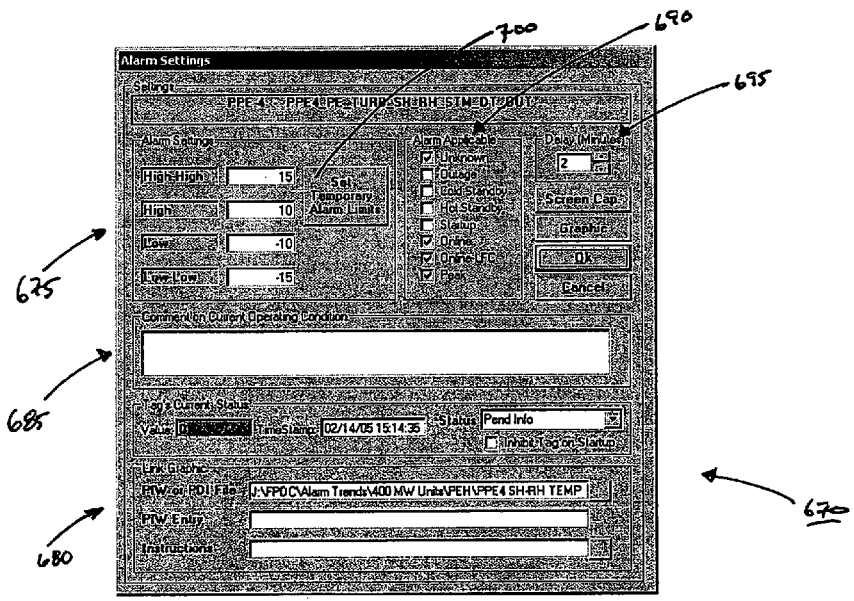
FIG. 10C is an illustration of yet another screen of the alarm system application.

Selecting a Settings button from the parameter buttons 640 in FIG. 10B can initialize another screen that allows the user to set the alarm values. FIG. 10C illustrates an Alarm Settings window 670. The Alarm Settings window 670 can show the settings for the individual alarms in greater detail. In addition, many of the settings for each alarm can be altered from the Alarm Setting window 670, including alarm bounds 675, documentation links 680, comments 685, and alarm application settings 690. The Alarm Settings window 670 can include four alarm bound fields 675, which can indicate the amount that the parameter must vary from the normal range for the alarm to be activated. The units can depend on the type of alarm (e.g., a temperature alarm can have units of degrees). The alarm application settings 690 can allow the user to select states of operation (of the manufacturing or plant facility) in which alarms will be active. For example, alarms can be activated or deactivated during a shutdown, a startup, or for any other suitable time. A delay box 695 can allow the user to specify a duration of time that the parameter must be outside the bounds of the normal range before an alarm is initiated. Temporary alarm limits can be set using a Temporary Alarm Limits button 700 of the screen of FIG. 10C, as also shown and described in greater detail with respect to FIG. 10D.

Figure 10D:
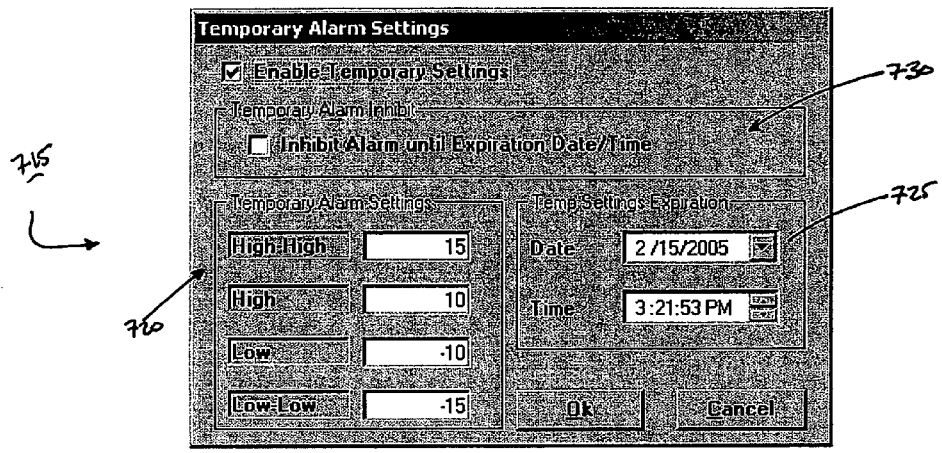
FIG. 10D is an illustration of still another screen of the alarm system application.

The user can set temporary alarm settings to specify alarm settings for a particular time period. FIG. 10D illustrates a Temporary Alarm Settings window 715. The user can set the temporary alarm settings, with Temporary Alarm Settings fields 720. The user can set the date and time that the temporary alarms will expire with Temp Settings Expiration fields 725. Temporary alarm settings can be used when the user is aware that the piece of equipment or machinery is going to be operating outside of the normal range for a particular time period. For example, a trial or test run of a new product or procedure can force equipment to operate outside of the normal range for a period of time. If the time of the trial/test run is know, temporary alarm settings can be used for that time period. The temporary alarm settings can also be used within other applications in addition to the individual alarm system application 40. A Temporary Alarm Inhibit option 730 can be used to stop alarms from being activated until the time entered in the Temp Settings Expiration field 725 has expired.

Figure 10E:
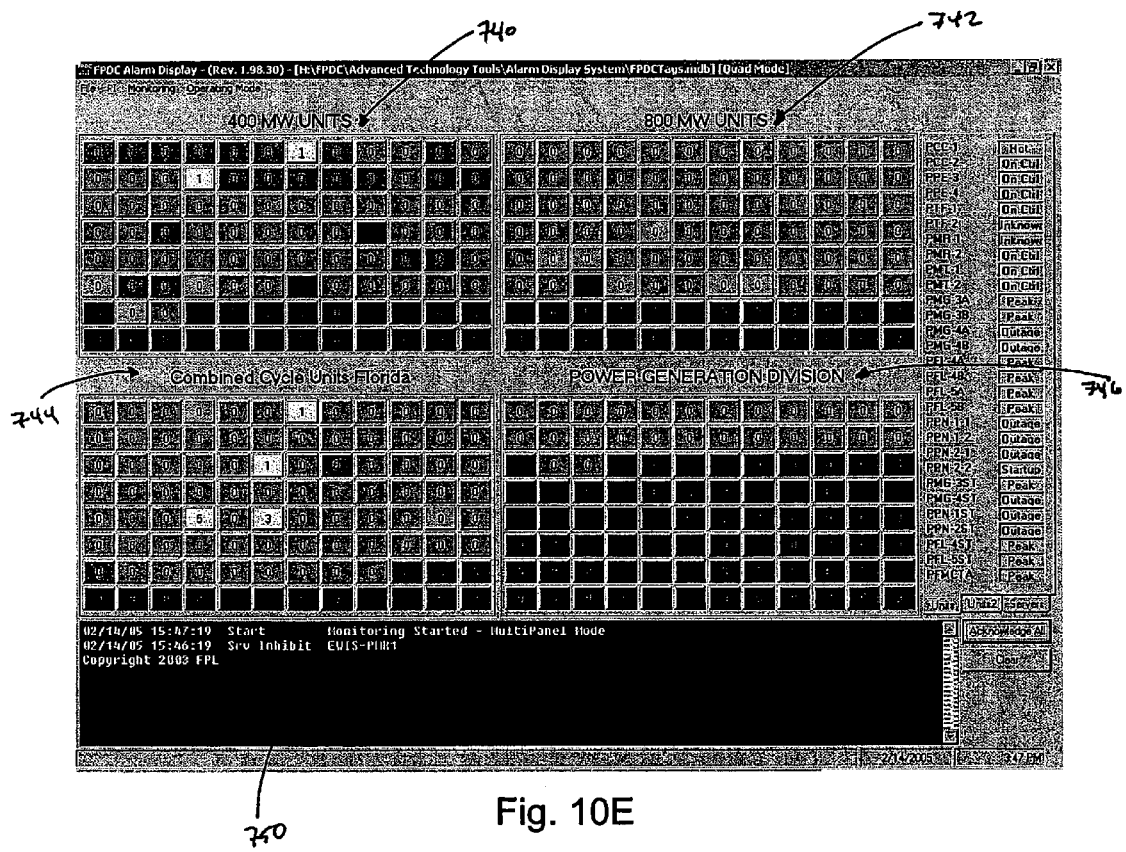
FIG. 10E is an illustration of a further screen of the alarm system application.

In one embodiment of the alarm system application 40, multiple sets of parameter blocks 620 can be viewed on the same screen. For example, as shown in FIG. 10E, four sets of parameter blocks 740-746 can be displayed simultaneously. Each set of parameter blocks 740-746 can correspond to a different unit, module, or division within a manufacturing or plant facility. Each set of parameter blocks 740-746 can also correspond to different manufacturing or plant facilities. A scrolling text box 750 can be included in the alarm system application 40 in order to display current and past alarms.

Figure 10F:
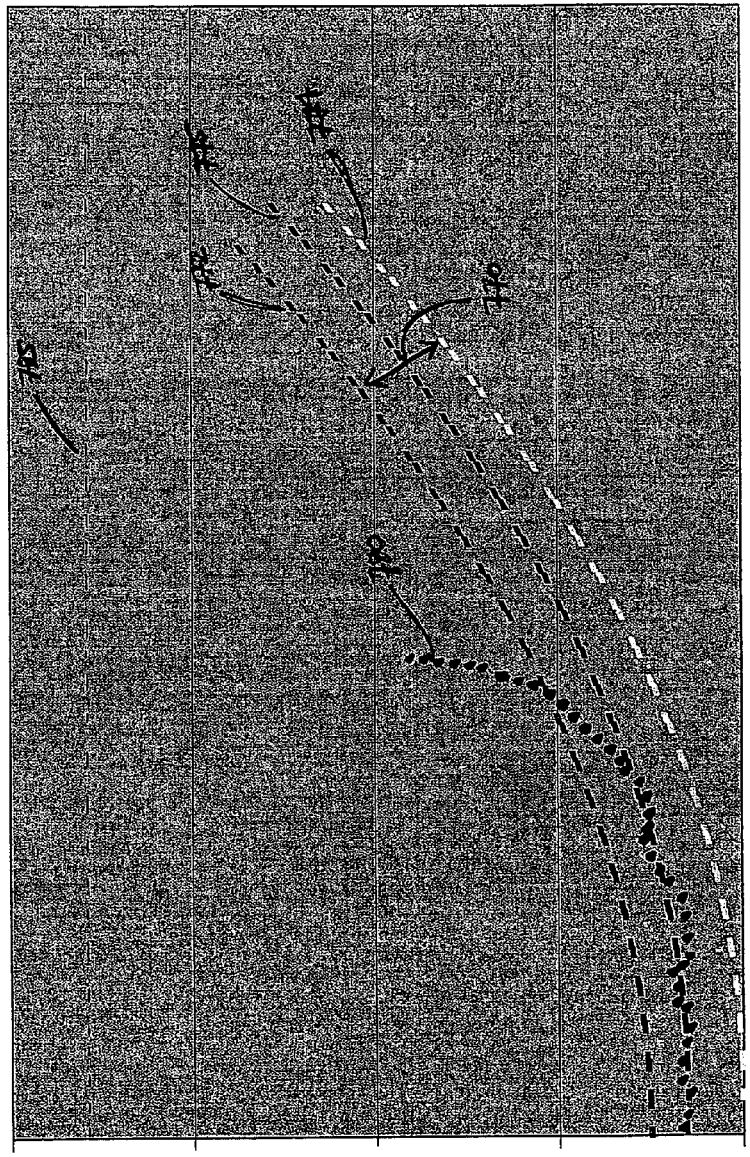
FIG. 10F is an illustration of yet another screen of the alarm system application.

The bounds of the alarm system application 40 can be set manually, as described with respect to FIGS. 10B-10D, or automatically. The bounds of the alarm system application 40 can be set automatically by reading the startup value of a parameter and applying a set threshold above and/or below that startup value. The bounds of the alarms can also be manually or automatically set to follow a normal model trend line. FIG. 10F illustrates a plot of an example of an alarm that follows a normal model trend. By setting alarms that follow a normal model trend, abnormal equipment data that may not otherwise signal an alarm can be initialized. As shown in FIG. 10F, an alarm threshold 770 can be set with an upper bound 772 and a lower bound 774, each of which follow a trend line 775. An alarm can be initiated when an actual data line 780 travels out of the normal range of the alarm threshold 770. Configuring the alarm system application 40 in this way can produce a more timely alarm than an initiation at a static alarm level 785.

Referring again to FIG. 1, the data analysis applications 10 can include one or more web-based applications 20, such as a capability monitor application 45, a capability report application 50, a model viewer application 55, and a crew capability application 60. The web-based applications 20 can be run from a computer with an Internet/intranet connection that is connected to the EWIS 27. It is not necessary to download the web-based applications 20 to a computer.

Figure 11A:
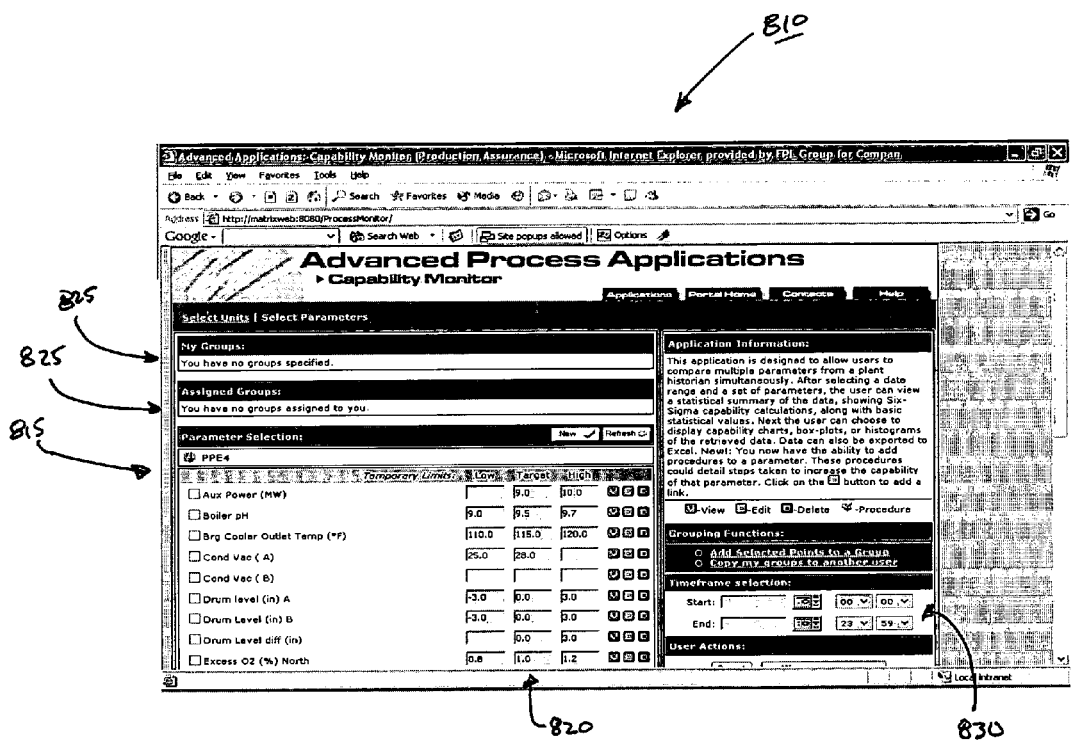
FIG. 11A is an illustration of a screen of the capability monitor application according to one embodiment of the invention.

FIG. 11A illustrates a screen of the capability monitor application 45. In one embodiment, the user can simultaneously compare multiple parameters from a data historian (e.g., the EWIS 27) via an intranet window 810. Equipment parameters can be listed in a parameter list 815 and can be configured with specification limits using limit fields 820. The equipment parameters listed in the parameter list 815 can be used to track the performance of the equipment or machinery. The capability monitor application 45 can also allow the user to group together similar parameters with grouping lists 825. A date and time range can be selected by the user with timeframe selection fields 830, and a statistical summary of the selected parameters can be displayed. Additionally, data retrieved from the EWIS 27 can be filtered so that only certain operating conditions are processed and displayed.

Figure 11B:
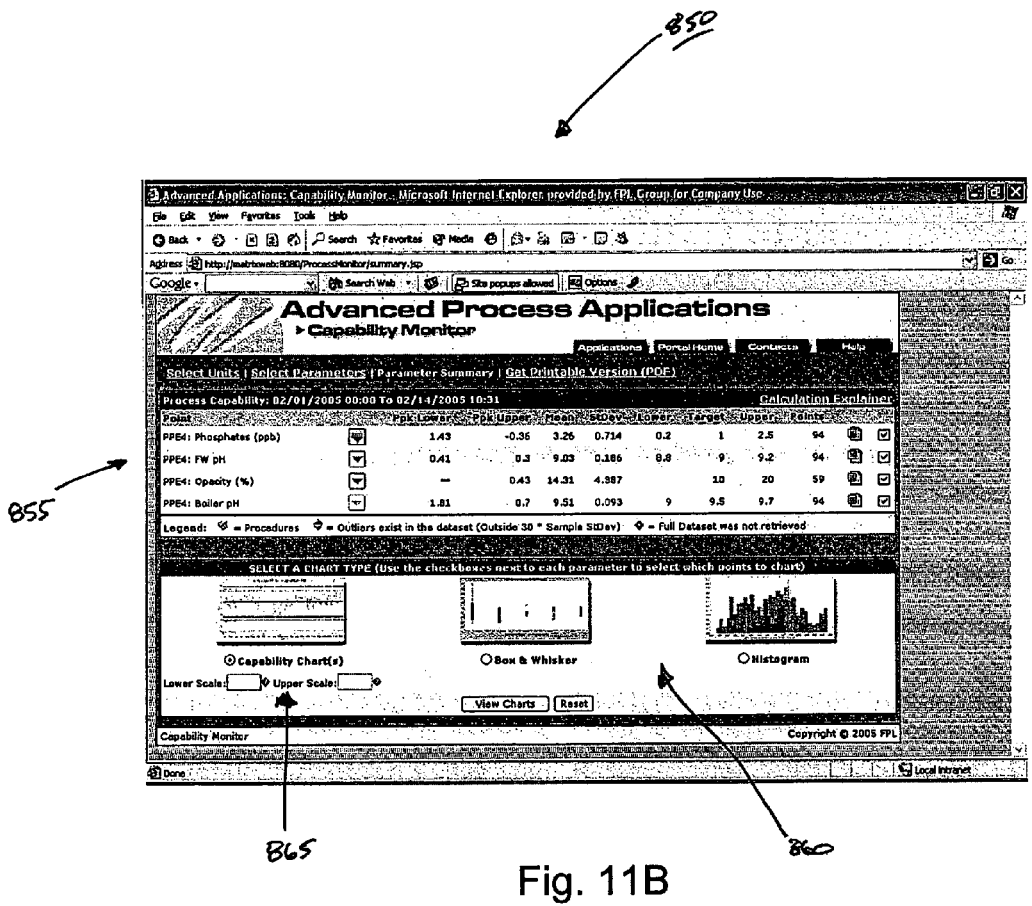
FIG. 11B is an illustration of another screen of the capability monitor application.

FIG. 11B illustrates a screen of a statistical summary 850 of particular parameters. The statistical 850 can be displayed in a summary window 855. The summary window 855 can include several options for displaying the data graphically. For example, the capability monitor application 45 can be used to create capability charts, box-plots, and histograms using chart creation options 860. The scales of the graphical display options can also be controlled by the user with scale selection fields 865.

Figure 12:
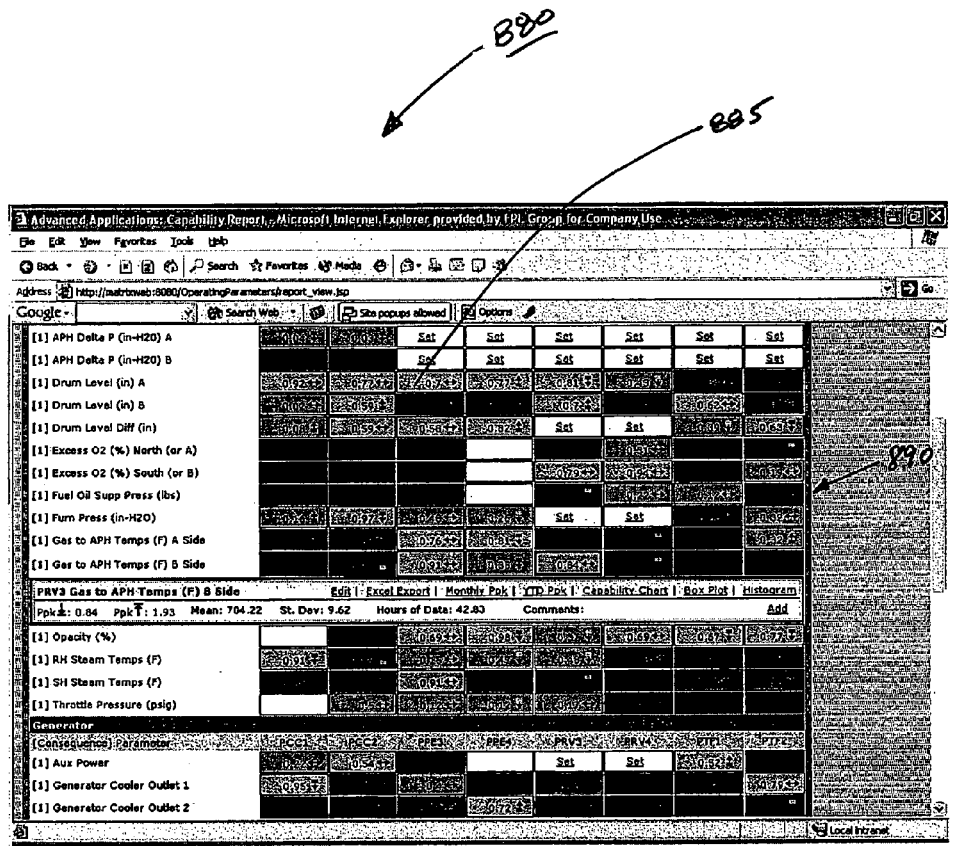
FIG. 12 is an illustration of a screen of a capability report application according to one embodiment of the invention.

The capability report application 50 can provide a monthly performance summary of equipment parameters. FIG. 12 illustrates a screen with a listing of parameters 880 for the capability report application 50. The capability report application 50 can allow the user to view a grid of parameters grouped by categories. In one embodiment, each parameter can be represented by a box 885 on a grid 890 that can contain a Six-Sigma process capability value ("Ppk"). The Six-Sigma process is a measure of quality that employs a data-driven approach for eliminating defects, which attempts to approach six standard deviations between the mean and the nearest specification limit. The parameter boxes 885 on the grid 890 can be color-coded based on the level of capability, and can also include an indicator graphic that illustrates how a parameter has performed compared to the previous month. The user can select a box 885 to display detailed information regarding the parameter. Similar to the capability monitor application 45, the capability report application 50 can display the information regarding a parameter graphically using capability charts, box plots, and/or histograms. In other embodiments, however, an alternative manner of graphical display can be used. In one embodiment, a summary of the data displayed can include Ppk values, mean values, and standard deviation values. Six-Sigma process calculations can be performed continuously, in some embodiments, to provide the user with a summary of the parameters, without the need to retrieve data in real-time. The user can also add a text comment to each parameter in order to explain to any subsequent user the performance of the selected parameter.

Figure 13A:
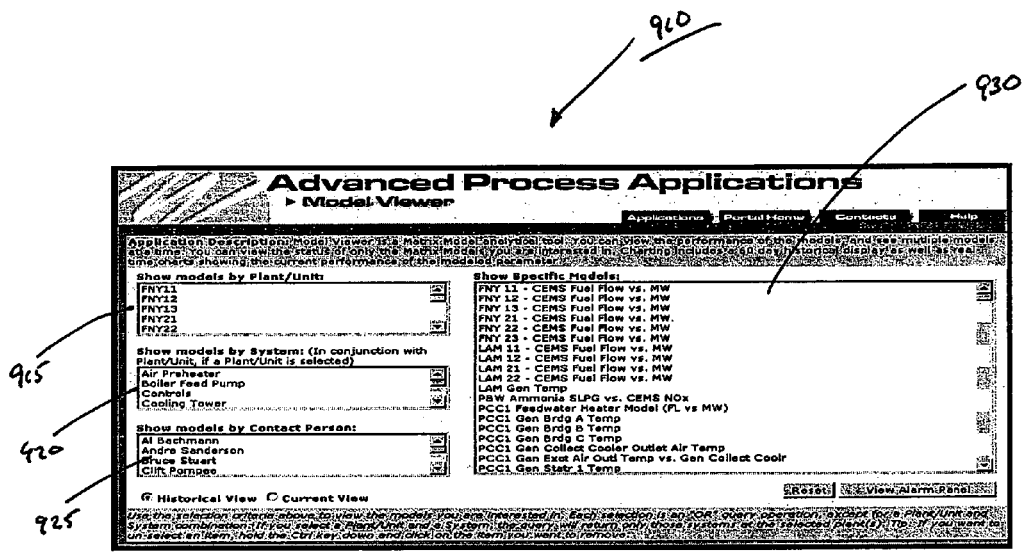
FIG. 13A is an illustration of a screen of a model viewer application according to one embodiment of the invention.

The model viewer application 60 shown schematically in FIG. 1 can provide an interface that can allow the user to access one or more regression models that were previously created with the matrix model builder application 30. The model viewer application 60 can be configured for many different types of models, and is not limited to models for one type of manufacturing process or plant facility. For example, the model viewer application 60 can be used to view regression models corresponding to wind turbines, compressors, and combustion chambers. The model viewer application 60 can also allow the models to be accessed and viewed in a manner that does not require any application to be downloaded and installed (e.g., the matrix model builder application 30 does not necessarily need to be downloaded and installed). FIG. 13A illustrates a model viewer interface 910 of the model viewer application 60. The model viewer interface 910 can allow the user to sort or filter the models in several different manners using model selection fields. For example, the models can be sorted or filtered according to plant/unit 915, system 920, contact person 925, and/or specific model 930.

Figure 13B:
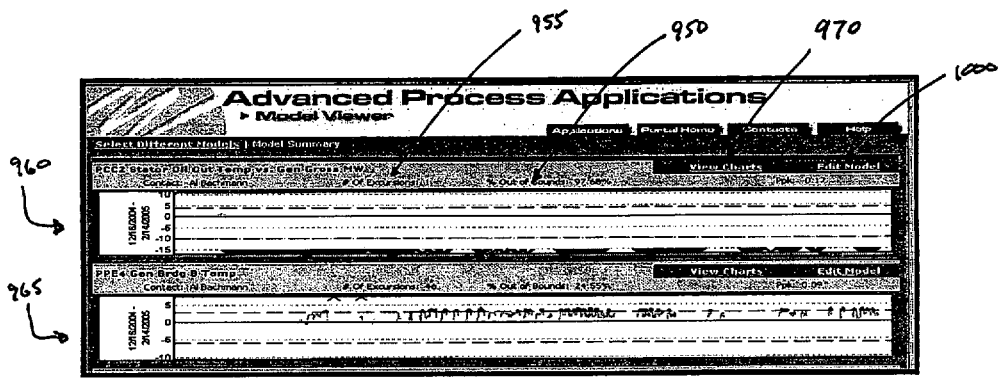
FIG. 13B is an illustration of another screen of the model viewer application.

After the user selects models using the screen of FIG. 13A, the model viewer application 60 can initialize another window that displays the selected models graphically, as shown in the screen of FIG. 13B. The models with the most severe "out of bounds" values can be organized and displayed first. A percentage of data outside bounds 950 and a number of excursions outside bounds 955 are examples of criteria that can be used to determine the level of severity and which models to display first. As shown in FIG. 13B, plots 960 and 965 can be displayed to yield a trend of data that distinguishes data falling outside of the established boundaries. A time range of sixty days can be used in some embodiments; however, other time ranges can be selected by the user.

Figure 13C:
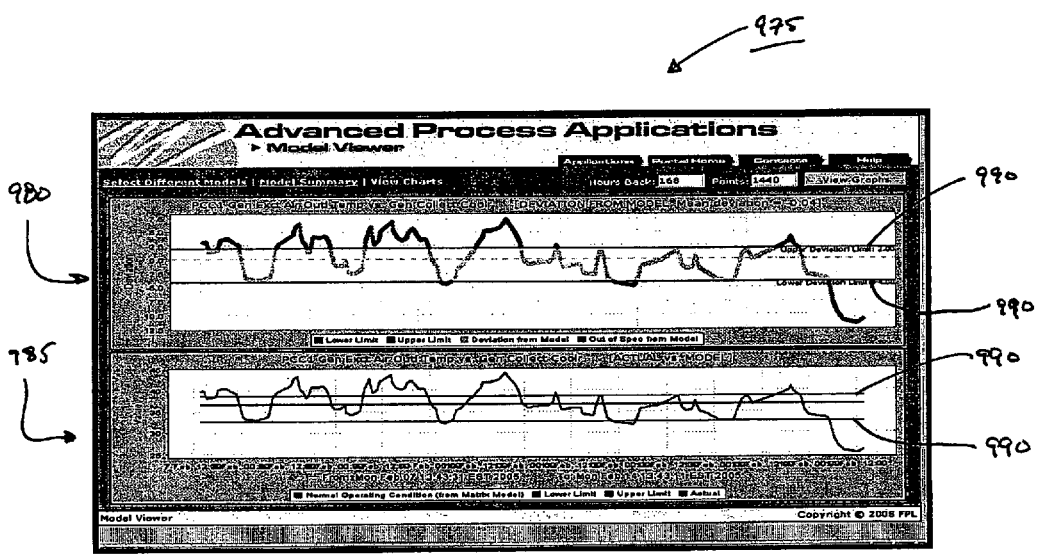
FIG. 13C is an illustration of yet another screen of the model viewer application.

The user can choose to initiate another graphical representation of the models of FIG. 13B by selecting a View Charts tab 970. FIG. 13C illustrates a chart view 975 with alternative plots that can be created by selecting the View Charts tab 970. In some embodiments, the chart view 975 can allow a more in-depth analysis of the selected model over a shorter time frame. The time field can be defaulted to 24 hours, but can be set to any desired time duration. Data trend plots shown in the chart view 975 can be displayed with alternative scales, including a deviation scaled plot 980 and an actual value scaled plot 985. The chart view 975 can organize the data displayed on both of the plots 980, 985 by the number of data points that are located outside of boundaries 990. The data that is included outside of boundaries 990 can be shaded differently as an indication to the user that the data is outside of the normal operating range.

Referring again to FIG. 13B, by selecting an edit model tab 1000, the user can choose to "retune" or edit the selected model. If the user chooses to fully edit the selected model, the matrix model builder application 30 can be launched to allow full editing capability. If the user chooses to merely retune the selected model, another screen can be initialized to alter the model for a different time range and/or different bounds.

Figure 13D:
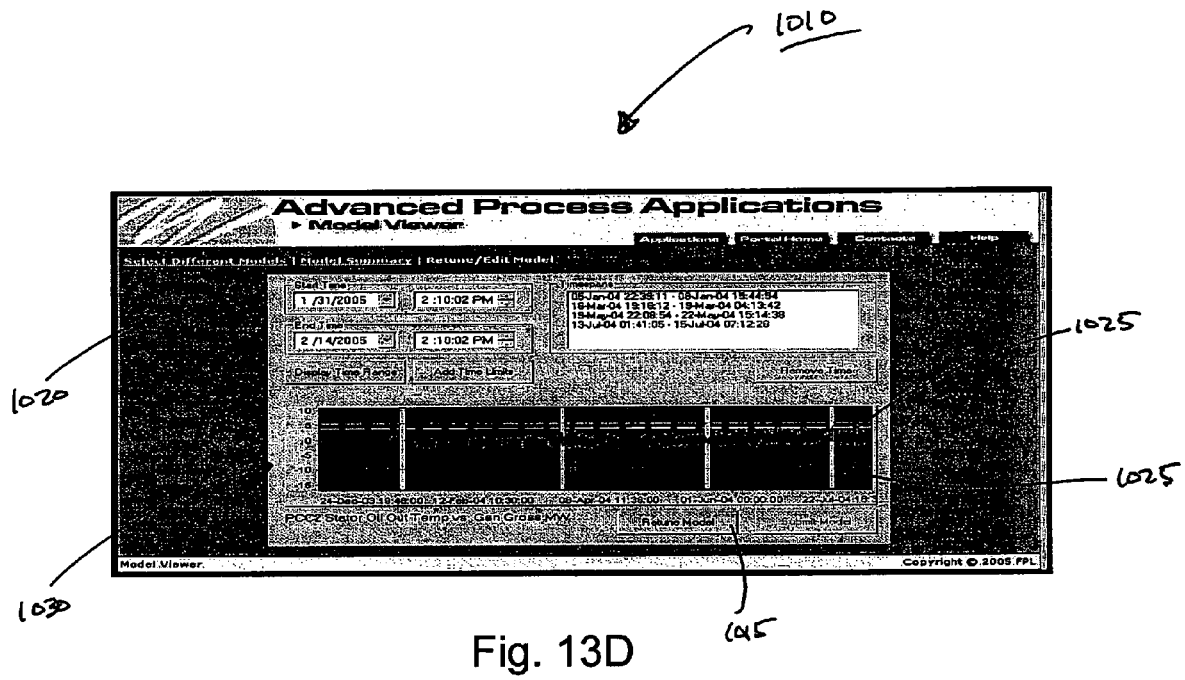
FIG. 13D is an illustration of still another screen of the model viewer application.

FIG. 13D illustrates a model retuning screen 1010 of the model viewer application 60. The selected model can be altered using a Retune Model button 1015. The user can choose a new time frame using time fields 1020 to access data that can serve as the new data set for the selected model. The user can also change the bounds of the selected model by widening or narrowing bounds 1025 in a plot area 1030. The model retuning screen 1010 of the model viewer application 60 can allow the user to make adjustments to models without opening the matrix model application 30.

Figure 14:
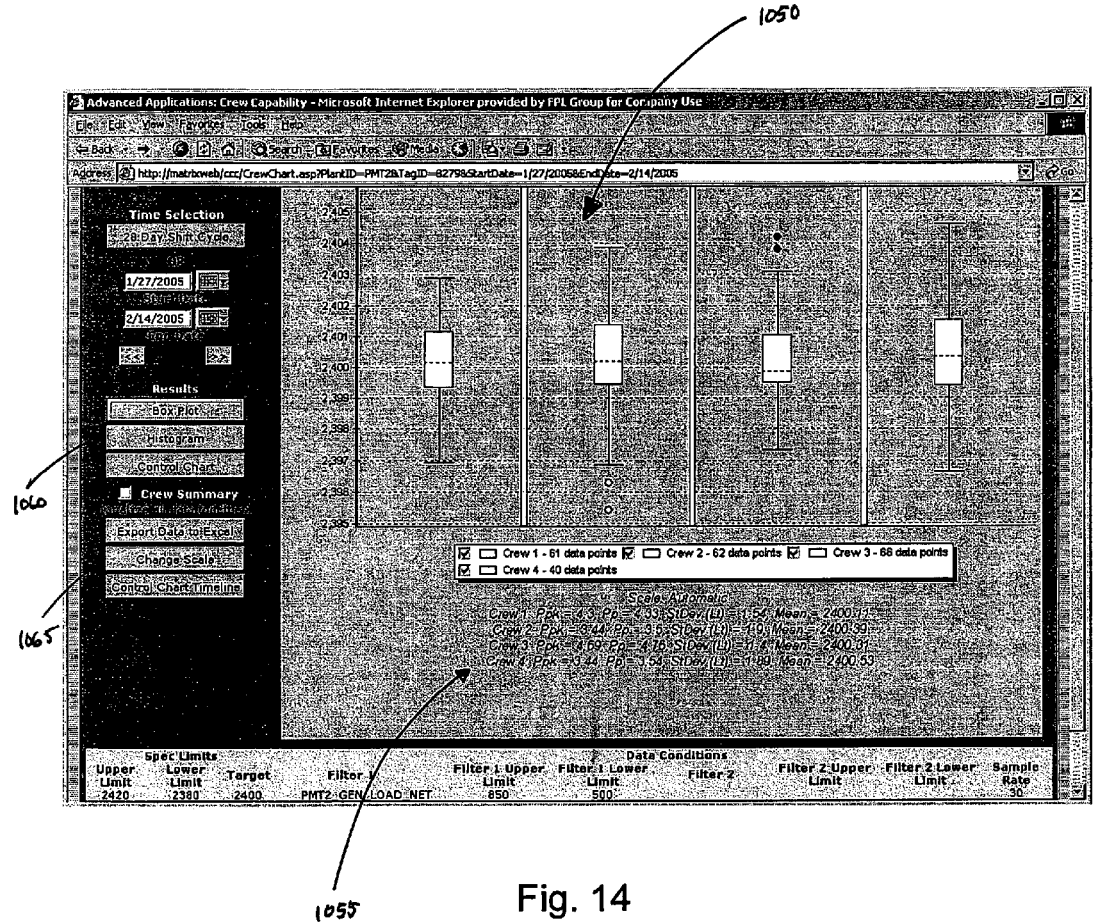
FIG. 14 is an illustration of a screen of a crew capability application according to one embodiment of the invention.

The crew capability application 65 shown schematically in FIG. 1 can allow the user to compare performance among various crews, for example, the employee crews of rotating shifts. FIG. 14 illustrates a screen that can compare four different crews with a box plot 1050. The crew capability application 65 can access parameter information and divide data points among crews according to the crew that is on shift at the time the data point is collected. The crew data can be viewed on a box-plot, as shown in FIG. 14, as well as on a histogram or a control chart. Additionally, a statistical summary of the data, showing Six-Sigma capability and/or basic statistical values, can be automatically calculated for selected parameters. As shown in FIG. 14, with a statistical data 1055 for each crew (i.e., crews 1-4) can be displayed along with a plot 1050. The manner in which the crew data is displayed (i.e., box plot, histogram, or control chart) can be selected by the user with a Plot Option buttons 1060. The crew data can also be exported to another application (e.g., Microsoft Excel spreadsheet) for statistical analysis with an Export button 1065.

Referring again to FIG. 1, the data analysis applications 10 can include a deviation tracker application 75 and an excursion monitor application 80, each of which can be implemented as a web-based application, as well as a downloadable application.

Figure 15A:
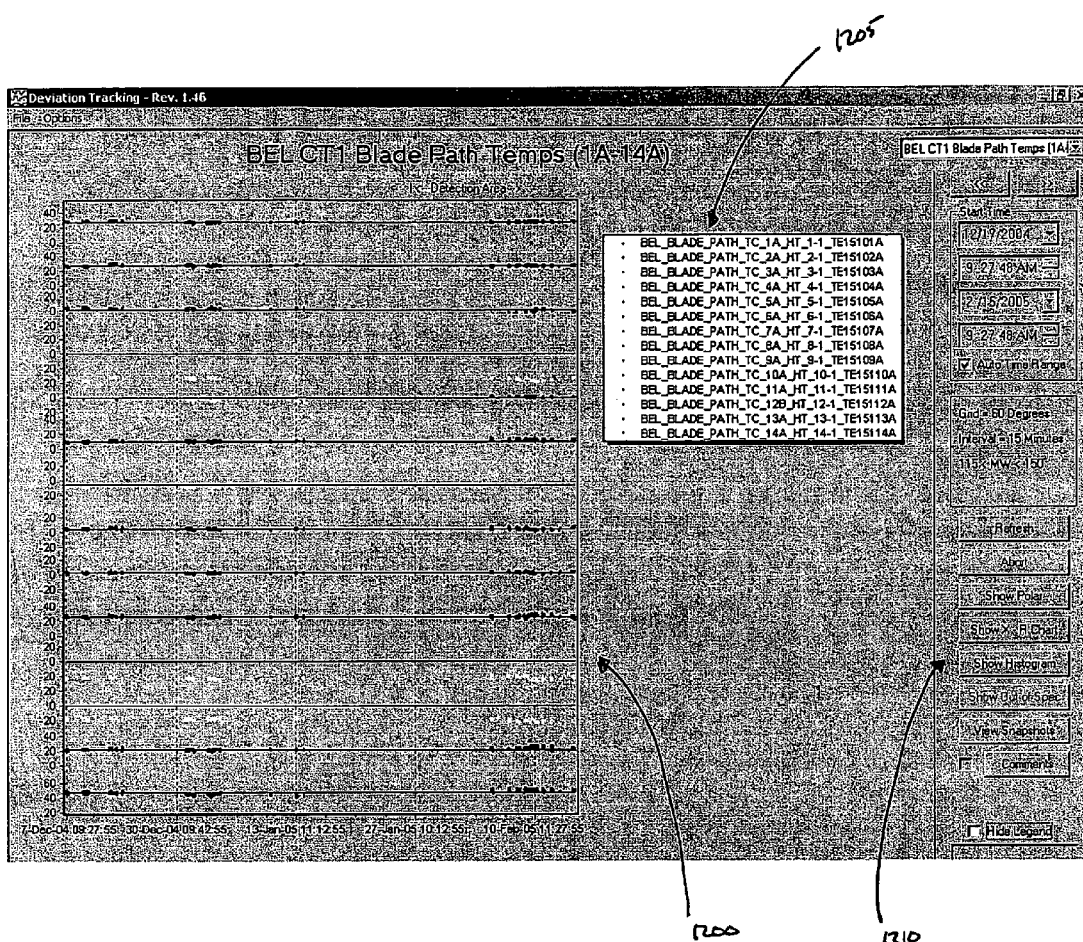
FIG. 15A is an illustration of a screen of a deviation tracker application according to one embodiment of the invention.

The deviation tracker application 75 can be used to filter and normalize multiple and related process parameters from the EWIS 27 and to display their behavior over time. For example, the temperature of multiple heating elements of a single machine can be tracked simultaneously. Regression analysis can be used to track the parameters and monitor changes in the values (i.e., step changes). Flags can be set to automatically alert a user if a step change exceeds a predetermined value set by the user. As shown in FIG. 15A, each selected parameter can be displayed in several charts 1200, one on top of the other, and each parameter name can be listed in a parameter list 1205. If there are too many charts 1200 to be monitored at one time, the deviation tracker application 75 can load each chart 1200 separately and can take a "snapshot" of the graphical display. A picture file of each snapshot can be created and viewed within the deviation tracker application 75 at a later time. The deviation tracker application 75 can also display the information shown in the charts 1200 in alternative manners, including a polar plot, an Xbar-R chart, and a histogram. Each alternative chart can be initialized using Chart Display buttons 1210.

Figure 15B:
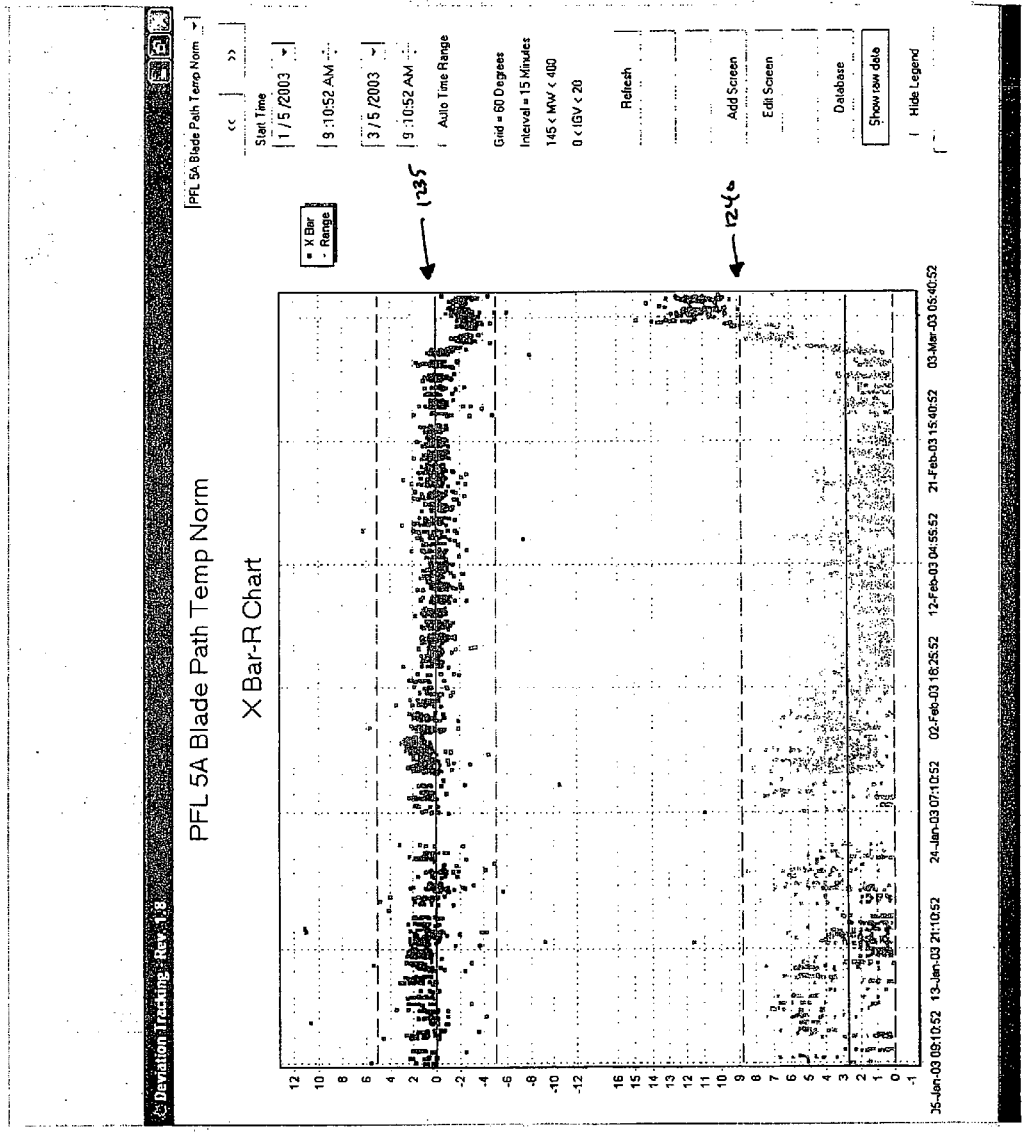
FIG. 15B is an illustration of another screen of the deviation tracker application.

FIG. 15B illustrates an Xbar-R chart 1230 created with the deviation tracker application 75. An X plot 1235 can be displayed above an R (range) plot 1240. The Xbar-R chart 1230 can be used to further analyze step changes observed in the charts 1200 of FIG. I 5A. Variability in data points on the range plot can signal a change in operation of the equipment that is being monitored, as well as signal the possibility of equipment failure. The X plot 1235 can be used to analyze the proximity of the data points to each other relative to the control limits. The scale of the X plot 1235 can be derived from the average range.

Figure 15C:
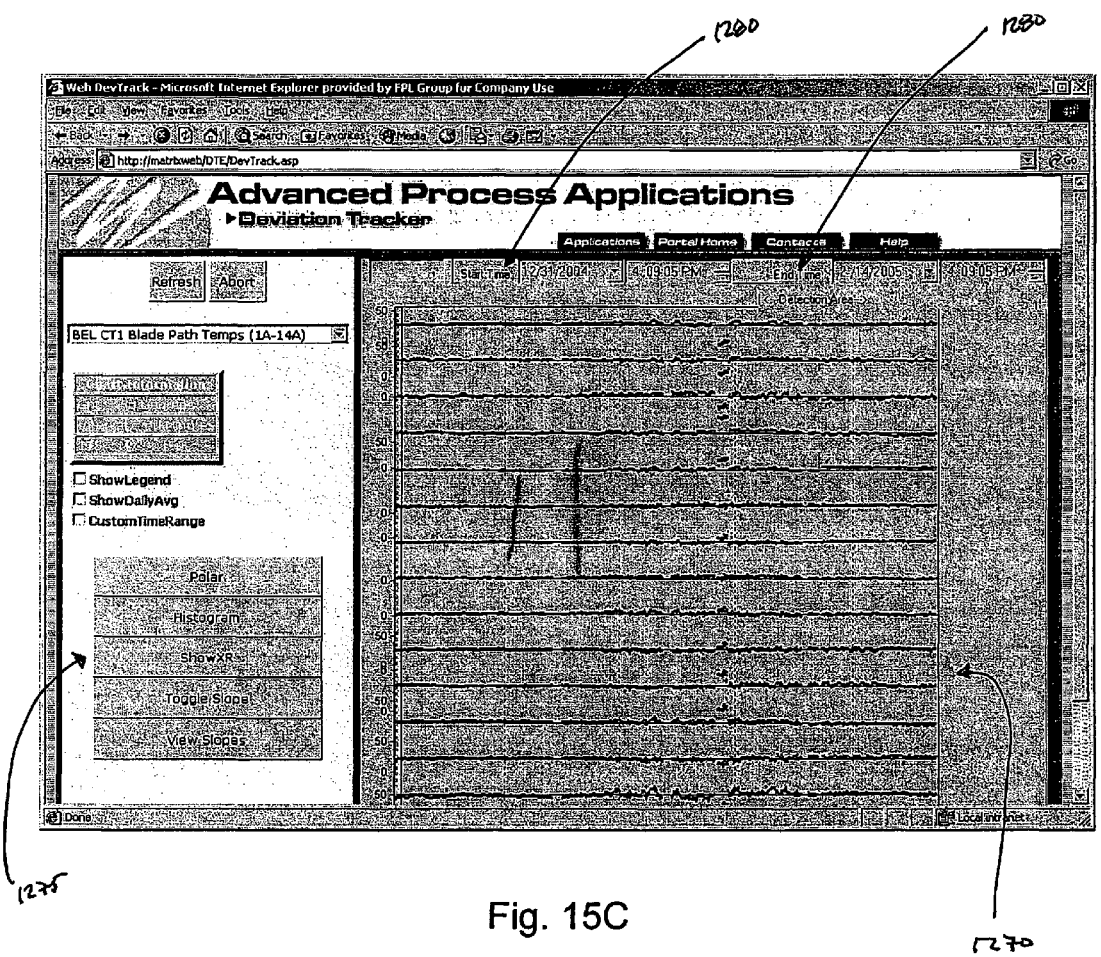
FIG. 15C is an illustration of yet another screen of the deviation tracker application.

FIG. 15C illustrates a screen of a deviation tracker application 75 shown schematically in FIG. 1 as a web-based application 20. FIG. 15C illustrates charts of parameters 1270, similar to the charts 1200 of FIG. 15A. Regression analysis can be used to provide plots for related parameters. The web-based application can also initialize various other graphical displays, such as a polar plot, a histogram, and an Xbar-R chart with Plot Option buttons 1275. The timeframe of the parameter data displayed can be customized using Timeframe fields 1280.

Figure 16A:
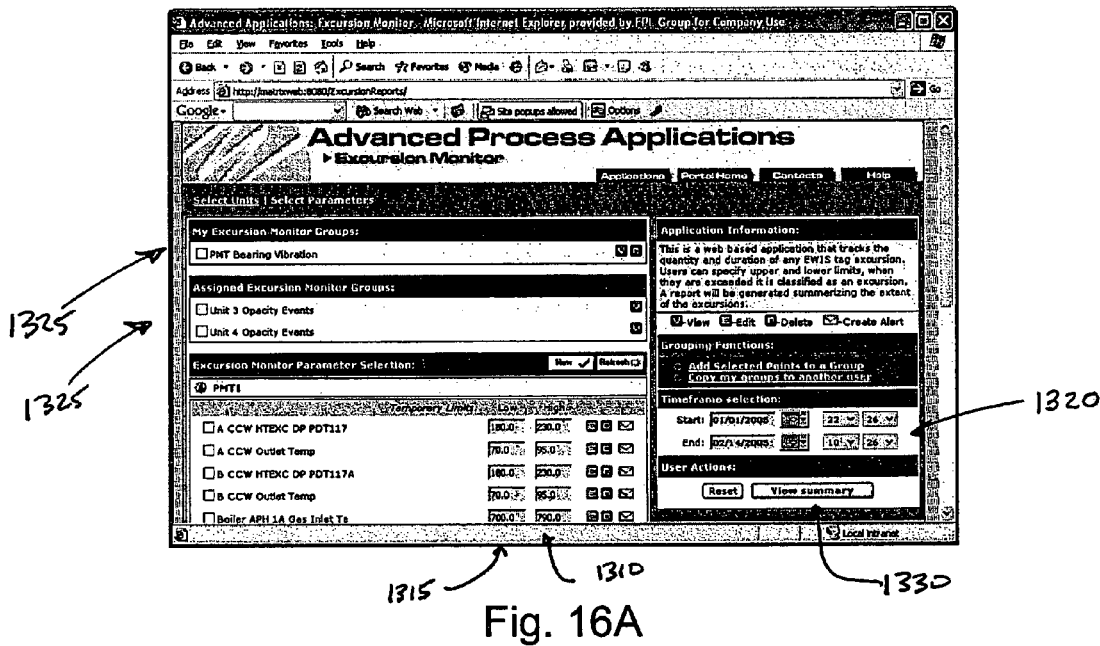
FIG. 16A is an illustration of a screen of an excursion monitor application according to one embodiment of the invention.

The excursion monitor application 80 shown schematically in FIG. 1 can be used to summarize excursions of parameters from specified operating limits or boundaries. FIG. 16A illustrates a web-based excursion monitor application 80. The user can set the limits of the excursion monitor application 80 via a high limit field 1310 and a low limit filed 1315. Data can be retrieved by the EWIS 27 and processed by the excursion monitor application 80 to measure the quantity and duration of excursions above or below the set limits. The timeframe that data is analyzed in can be set by the user with timeframe selection fields 1320. Groups of variables can also be organized to monitor multiple parameters of a single piece of equipment or machinery. The group settings can be displayed in group display fields 1325. After the desired parameters and timeframe have been selected, the user can select a View Summary button 1330 to view a summary of the excursion results.

Figure 16B:
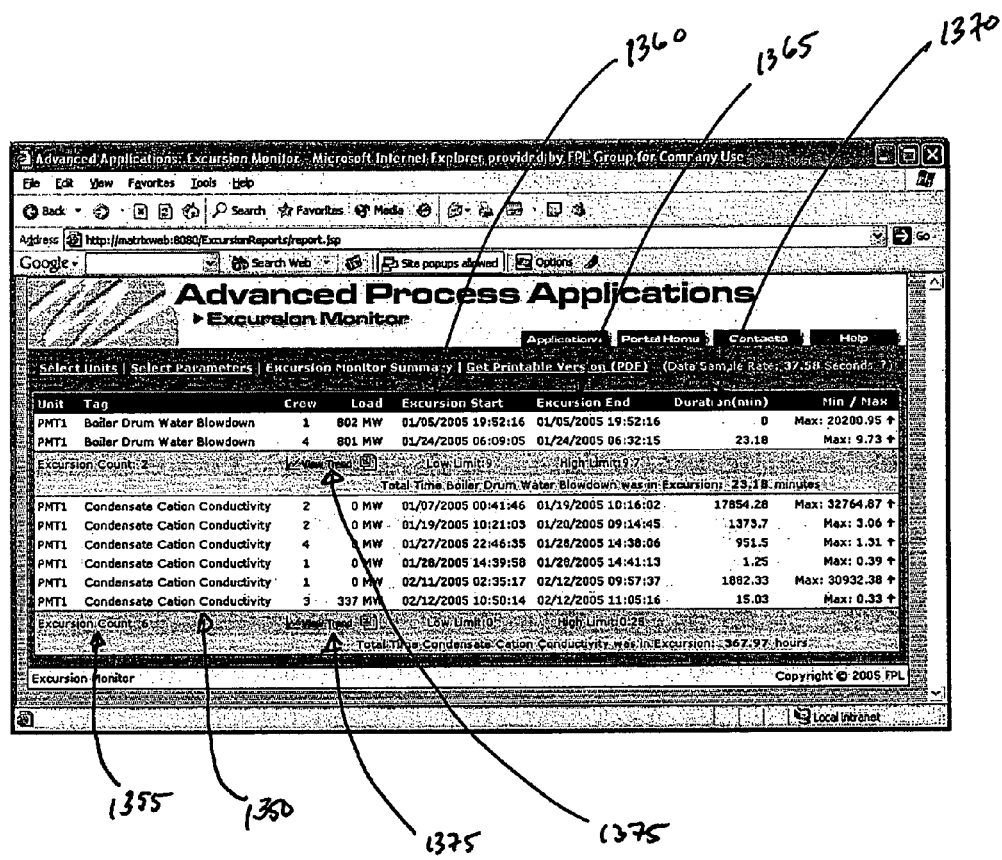
FIG. 16B is an illustration of another screen of the excursion monitor application.

FIG. 16B illustrates a screen with a summary of excursions created with the excursion monitor application 80. Each parameter that was tracked can be displayed in a Tag field 1350, with a number of excursions 1355 for that tag listed below. There can also be various other types of excursion information listed for each tag, for example, a starting time 1360, an ending time 1365, and a duration 1370 of the excursion. A summary of excursions report can be exported in a variety of formats (e.g., PDF), which allows the user to save and print the summary information. The user can also view a chart of the excursions by selecting a View Trend link 1375.

Figure 16C:
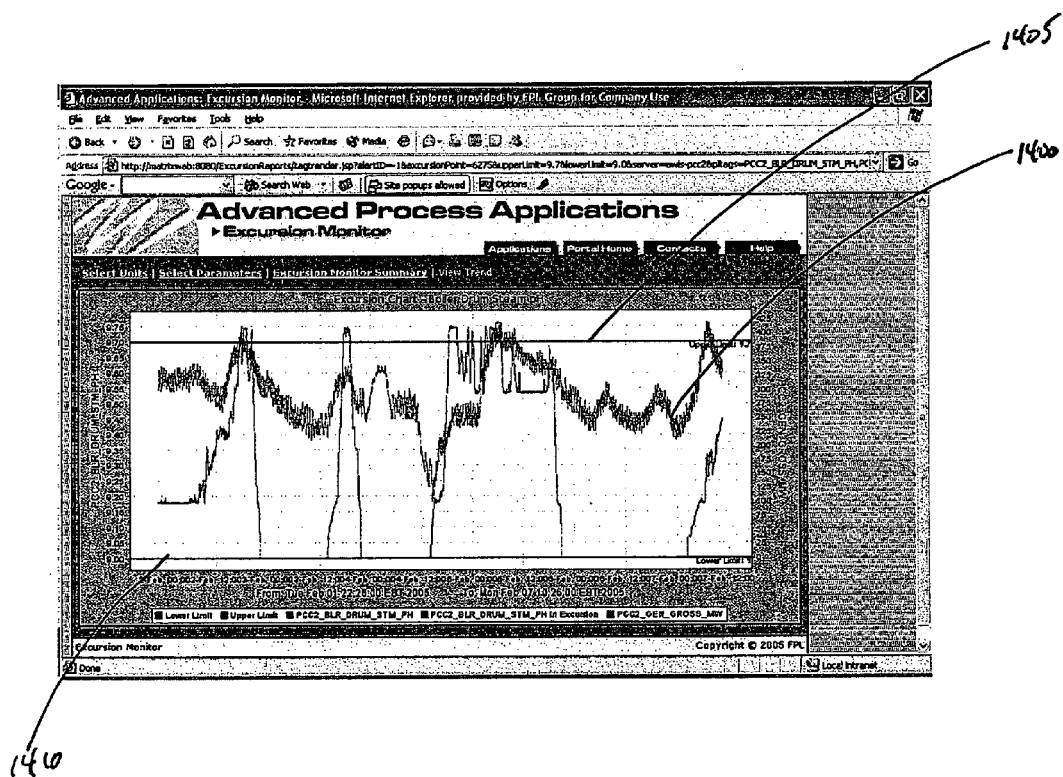
FIG. 16C is an illustration of yet another screen of the excursion monitor application.

FIG. 16C illustrates a chart of the excursions. The chart of the excursions can include data trend 1400, an upper excursion limit 1405, and a lower excursion limit 1410. The chart of excursions can be a visual tool to display each excursion graphically for analysis.

Figure 16D:
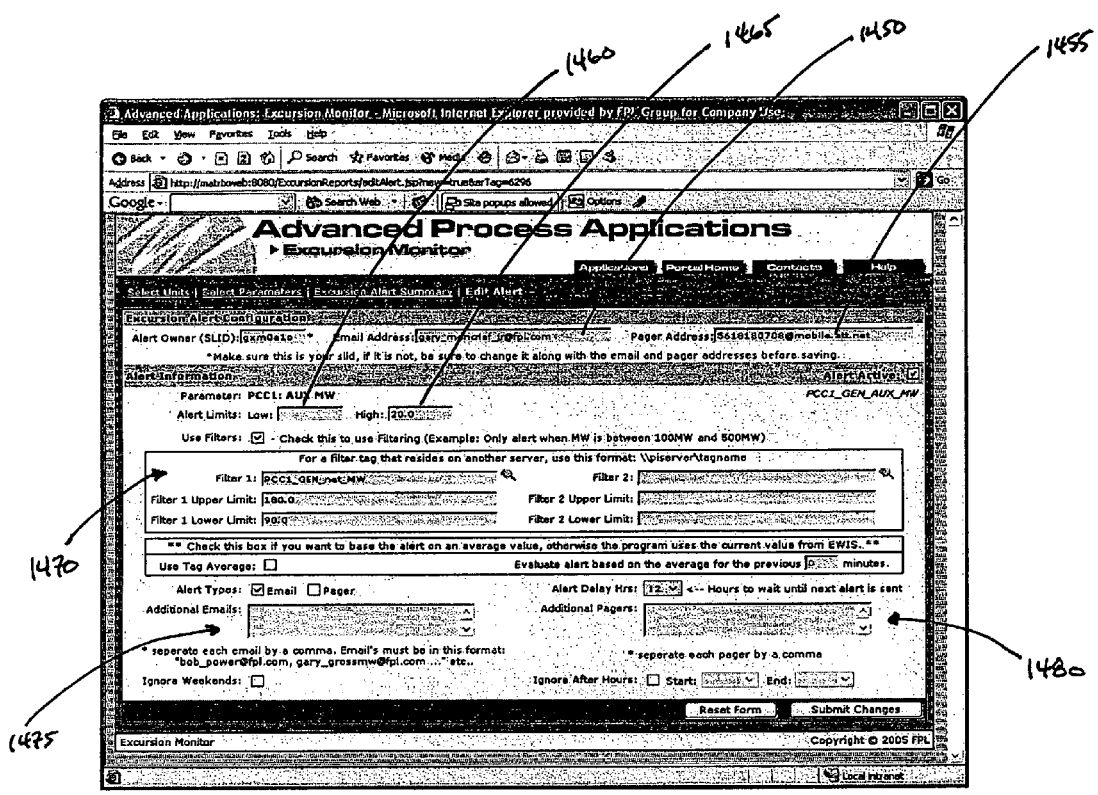
FIG. 16D is an illustration of a further screen of the excursion monitor application.

Excursions from a normal operating range can signal a problem with the piece of machinery or equipment. A notification can be sent to one or more users when an excursion occurs. Notifications can be sent in a variety of manners (e.g., phone, pager, email, etc.) to one or more designated users. FIG. 16D is a screen of an excursion alert screen of the excursion monitor application 80. The excursion alert screen can include an email address field 1450, as well as a pager number field 1455. The excursion alert screen can be configured to notify the user if the parameters travel outside of a specified upper boundary 1460 or a lower boundary 1465. Filters 1470 can also be applied so that alerts are not sent if the parameter that is being tracked is not within a specific range (e.g., only alert the user if the equipment temperature is between 200 and 400 degrees). Additionally, several users can be notified of an excursion at substantially the same time. The user can enter several email addresses in the email address field 1450 and several pager numbers in the pager number field 1455. Times to suspend excursion notifications from being sent (e.g., on weekends or after working hours) can also be chosen by the user. The excursion alert screen can be configured to operate by substantially continuously retrieving data from the EWIS 27 and comparing the data to the upper and lower boundaries 1460, 1465. The data retrieved from the EWIS 27 can include current values, as well as average values, over a chosen time duration (e.g., a 30 minute average). An excursion notification can include a summary of the excursion with the current value, the configured limits, and the excursion type (i.e., above or below the boundaries). The user can also view a trend of the excursion, export the data from the excursion, or modify the excursion limits, as shown and described with respect to FIG. 16E.

Figure 16E:
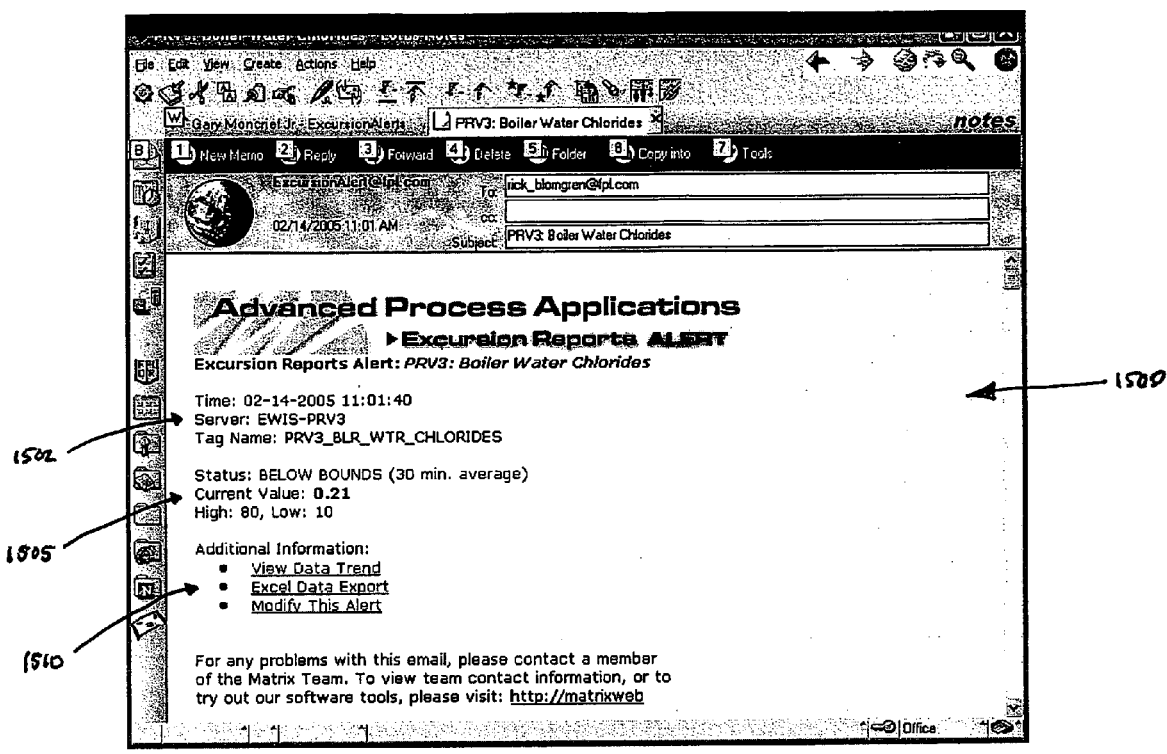
FIG. 16E is an illustration of still another screen of the excursion monitor application.

FIG. 16E illustrates a screen with an email notification 1500. The user can be notified of parameter information 1502, a status 1505 of the parameter, and other alert options 1510. The status 1505 of the parameter can include information regarding the current value of the parameter, as well as the upper and lower boundaries. The user can choose to display the notification information in a trend plot, export the data to a spreadsheet, or modify the notification with alert options 1510.

Figure 16F:
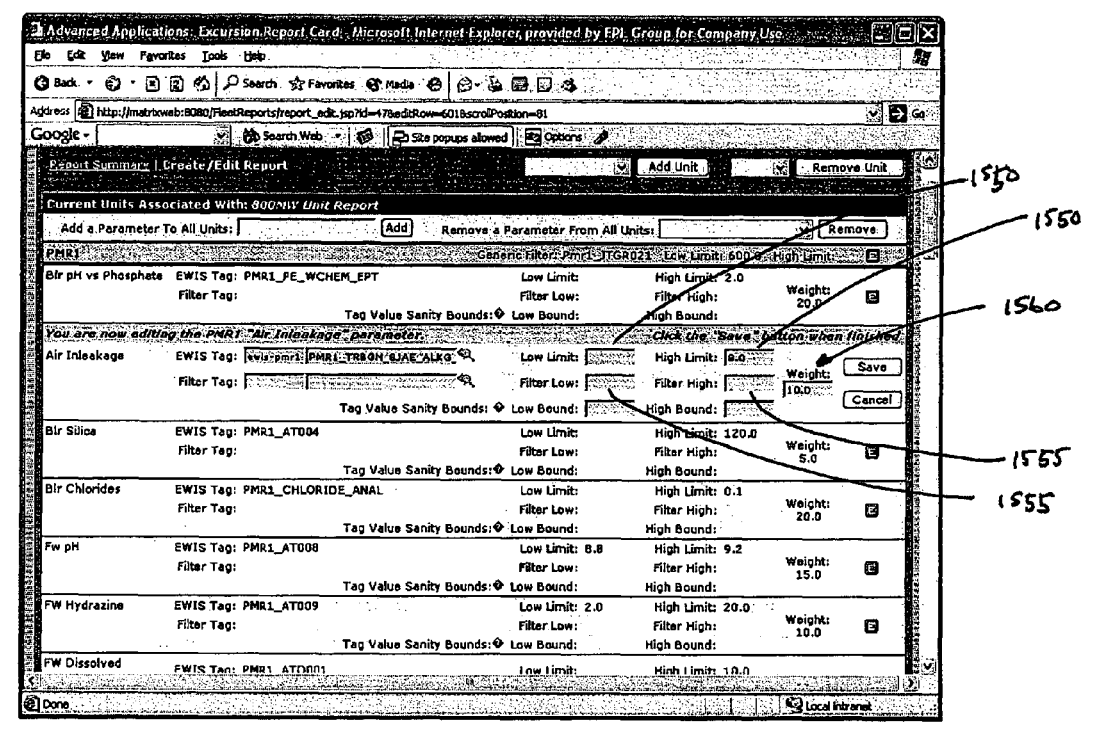

In another embodiment, the excursion monitor application 80 can include an excursion report card that allows a user to compare facilities based on categorized indicators. FIG. 16F illustrates an example of an excursion report card screen for use with the excursion monitor application 80. Specification limits can be set for each indicator with limit fields 1550, and daily data processing can be performed to determine how long the selected parameter is within limits. Filters can also be used to discern certain operating conditions to be processed with filter fields 1555. The data that is processed with the excursion monitor report card can be organized in a variety of ways. For example, the data that has been processed for a given time period (e.g., one day) can be stored in a database and compiled in monthly reports. Each indicator that is processed can have an associated importance value 1560 (i.e., a weight) that is entered by the user as a percentage, which can add up to 100% of the total report card value.

Figure 16G:
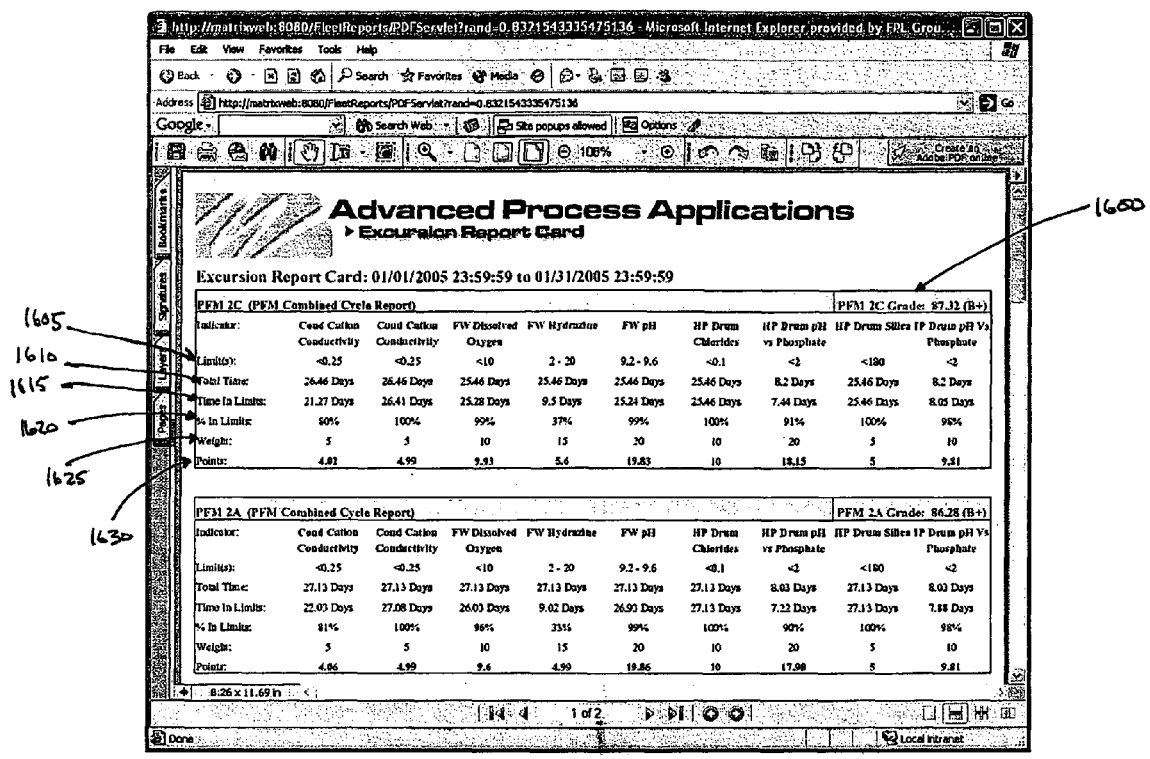
FIG. 16G is an illustration of another screen of the excursion monitor application.

FIG. 16G illustrates a report card generated with the excursion report card screen of FIG. 16F. A report card score 1600 can be based on the percentage of time that the indicators are operating within specified limits. However, in other embodiments, the report card score 1600 can be based on other conditions. Information regarding the indicators that are being tracked can be displayed for the user to analyze. The indicators can be tracked on parameters including operating limits 1605, total time the indicator was in operation 1610, total time the indicator was operating in the specified limits 1615, percentage of time that the indicator was operating in the specified limits 1620, weight designated to the indictor 1625, and points designated to the indicator 1630. Each of these values can be displayed in the report card of FIG. 16G.

Various features and advantages of the invention are set forth in the following claims.

The invention claimed is:

1. A system for monitoring equipment performance and predicting failures, the system comprising:
   a data historian that stores historical data for a piece of equipment and designates the historical data with at least two input tags;
   at least one sensor that gathers new data from the piece of equipment corresponding to the at least two input tags; and
   a matrix model builder application that allows a user to select a first time span for the at least two input tags from the historical data, that generates a regression model including an expected output tag for the at least two input tags, that allows a user to select a second time span for the at least two input tags from the new data, and that compares the second time span with the new data to the expected output tag to determine whether the new data is within a normal operating range.

2. The system of claim 1 wherein the matrix model builder application generates a polynomial regression model including at least one of a linear regression model, a quadratic regression model, and a cubic regression model.

3. The system of claim 1 wherein the matrix model builder application generates a regression model including a standard deviation of the data and an equation of a surface of the data.

4. The system of claim 1 wherein the matrix model builder application allows a user to select and plot upper and lower bounds for the normal operating range for the piece of equipment.

5. The system of claim 4 wherein the matrix model builder application displays a percentage of the new data that is included within the upper and lower bounds.

6. The system of claim 1 wherein the matrix model builder application plots at least one of the first time span of historical data, the second time span of new data, upper bounds, and lower bounds.

7. The system of claim 1 wherein the matrix model builder application represents the historical data with squares and represents the new data with lines.

8. The system of claim 1 wherein data historian designates the historical data and the new data with a plurality of tags.

9. The system of claim 1 wherein the matrix model builder application generates a regression model for the at least two input tags, the regression model providing an expected output tag for a normal operating range for the piece of equipment.

10. The system of claim 1 wherein the matrix model builder application allows a user to alter the first time span of the historical data and generate a new regression model.

11. The system of claim 1 wherein the matrix model builder application allows a user to plot at least one of the first time span of the historical data and the second time span of the new data on at least one of a two-dimensional plot and a three-dimensional plot.

12. The system of claim 1 wherein the matrix model builder application allows a user to alter the at least two input tags to generate a new regression model with a new expected output tag.

13. The system of claim 1 wherein the matrix model builder application allows a user to generate a plurality of regression models and choose one regression model to apply to the second time span of the new data.

14. The system of claim 1 wherein the matrix model builder application allows a user to generate and save a plurality of regression models for characterizing normal performance for the piece of equipment.

15. The system of claim 1 and further comprising an equation processor application that loads the regression model, retrieves the new data, calculates an actual output using the regression model, and writes the actual output to a database.

16. The system of claim 15 wherein the equation processor application at least one of monitors the actual output of the new data in real-time and compares the actual output to the expected output tag in real-time.

17. The system of claim 1 and further comprising an alarm system application that initializes an alarm signal when an actual output of the new data varies from the expected output tag.

18. The system of claim 17 wherein the alarm system application transmits an alarm notification to at least one user based on the alarm signal.

19. The system of claim 17 wherein the alarm system application color-codes a parameter block displayed on an alarm screen based on a severity of the alarm signal.

20. The system of claim 19 wherein the alarm system application displays a plurality of color-coded parameter blocks corresponding to a plurality of parameters on the alarm screen.

21. The system of claim 20 wherein the alarm system application allows a user to select one of the plurality of color-coded parameter blocks in order to alter alarm settings for one of the plurality of parameters.

22. The system of claim 17 wherein the alarm system application allows a user to specify at least one of temporary and permanent alarm settings.

23. The system of claim 17 wherein the alarm system application automatically specifies alarm bounds by applying a set threshold at least one of above and below a startup value.

24. The system of claim 1 and further comprising a trend viewer application that allows a user to view a trend of at least one of the new data and the historical data by plotting data for a plurality of time ranges on a single plot.

25. The system of claim 24 wherein the trend viewer application provides a statistical summary of a plurality of tags from at least one of the new data and the historical data.

26. The system of claim 25 wherein the trend viewer application creates a statistical summary with at least one of a capability chart, a box plot, and a histogram.

27. The system of claim 26 wherein the trend viewer application creates a capability chart with a grid of color-coded parameters grouped by a plurality of categories, each one of the color-coded parameters including at least one of a process capability value, a mean value, and a standard deviation value.

28. The system of claim 1 wherein the at least one sensor gathers new data from at least one of a turbine, a compressor, a combustion chamber, an air preheater, a boiler feed pump, a heating element, and a cooling tower.

29. The system of claim 1 and further comprising a model viewer application that allows a user to sort a plurality of regression models by at least one of plant, system, and contact person.

30. The system of claim 29 wherein the model viewer application compares an actual output of the new data to the expected output tag and generates at least one of a deviation scaled plot and an actual value scaled plot.

31. The system of claim 1 and further comprising a crew capability application that generates a crew capability report to compare performance among various employee crews.

32. The system of claim 1 and further comprising a deviation tracker application that tracks deviations between actual outputs of the new data and expected output tags by filtering and normalizing multiple tags and by displaying multiple charts on a single screen.

33. The system of claim 32 wherein the deviation tracker application tracks deviations between actual outputs of the new data and expected output tags by filtering and normalizing multiple tags and by generating at least one of a polar plot, an Xbar-R chart, and a histogram.

34. The system of claim 32 wherein the deviation tracker application monitors at least one of quantity and duration of excursions of an actual output from the expected output tag.

35. The system of claim 32 wherein the deviation tracker application generates an excursion notification when at least one of the quantity and the duration of the excursion exceeds a threshold.

* * * * *